United States Patent
Yu et al.

(10) Patent No.: US 11,638,003 B2
(45) Date of Patent: Apr. 25, 2023

(54) VIDEO CODING AND DECODING METHODS AND DEVICES USING A LIBRARY PICTURE BITSTREAM

(71) Applicants: Zhejiang University, Zhejiang (CN); Huawei Technologies Co., Ltd., Shenzhen (CN)

(72) Inventors: Lu Yu, Hangzhou (CN); Ye-Kui Wang, Shenzhen (CN); Hualong Yu, Hangzhou (CN); Yin Zhao, Hangzhou (CN); Yuqun Fan, Shenzhen (CN); Xiaoding Gao, Hangzhou (CN); Haitao Yang, Shenzhen (CN)

(73) Assignees: Zhejiang University, Zhejiang (CN); Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/370,120

(22) Filed: Jul. 8, 2021

(65) Prior Publication Data

US 2021/0344903 A1    Nov. 4, 2021

Related U.S. Application Data

(63) Continuation of application No. PCT/CN2020/070592, filed on Jan. 7, 2020.

(30) Foreign Application Priority Data

Jan. 8, 2019   (CN) .......................... 201910018725.6
Sep. 19, 2019  (CN) .......................... 201910888383.3

(51) Int. Cl.
*H04N 19/105*    (2014.01)
*H04N 19/172*    (2014.01)
(Continued)

(52) U.S. Cl.
CPC ......... *H04N 19/105* (2014.11); *H04N 19/172* (2014.11); *H04N 19/184* (2014.11); *H04N 19/46* (2014.11)

(58) Field of Classification Search
CPC .. H04N 19/105; H04N 19/172; H04N 19/184; H04N 19/46; H04N 21/234327;
(Continued)

(56) References Cited

U.S. PATENT DOCUMENTS

| 2005/0053158 A1* | 3/2005 | Regunathan ........... H04N 19/86 375/E7.199 |
| 2013/0170544 A1* | 7/2013 | Hao ..................... H04N 19/132 375/240.03 |

(Continued)

FOREIGN PATENT DOCUMENTS

| CN | 102238390 A | 11/2011 |
| CN | 105100801 A | 11/2015 |

(Continued)

OTHER PUBLICATIONS

N. Vasconcelos and A. Lippman, "Library-based image coding," Proceedings of ICASSP '94. IEEE International Conference on Acoustics, Speech and Signal Processing, 1994, pp. V/489-V/492 vol. 5, doi: 10.1109/ICASSP.1994.389464. (Year: 1994).*

(Continued)

*Primary Examiner* — Marnie A Matt
(74) *Attorney, Agent, or Firm* — Leydig, Voit & Mayer, Ltd.

(57) ABSTRACT

A video encoding method, a video decoding method, an apparatus, a device, and a storage medium include parsing a first flag from the video bitstream when a video bitstream is allowed to be decoded by referencing a library picture corresponding to a library picture bitstream, using a value of a target parameter of the video bitstream as a value of a (Continued)

target parameter of the library picture bitstream referenced by the video bitstream when a value of the first flag is a first value, and reconstructing, based on the value of the target parameter of the library picture bitstream referenced by the video bitstream and the library picture bitstream referenced by the video bitstream to obtain the library picture corresponding to the library picture bitstream referenced by the video bitstream.

17 Claims, 12 Drawing Sheets

(51) Int. Cl.
*H04N 19/184* (2014.01)
*H04N 19/46* (2014.01)

(58) Field of Classification Search
CPC .... H04N 19/58; H04N 19/70; H04N 21/2353; H04N 21/8451; H04N 19/117; H04N 19/103; H04N 19/124; H04N 19/176; H04N 19/44; H04N 19/52; H04N 19/61; H04N 19/625; H04N 19/91; H04N 19/96; H04N 21/4402; H04N 21/845
USPC ........................................................ 375/240
See application file for complete search history.

(56) References Cited

U.S. PATENT DOCUMENTS

| | | |
|---|---|---|
| 2014/0003799 A1 | 1/2014 | Soroushian et al. |
| 2015/0304665 A1 | 10/2015 | Hannuksela et al. |
| 2016/0119673 A1 | 4/2016 | Rees |
| 2018/0014012 A1 | 1/2018 | Yu et al. |
| 2019/0089981 A1 | 3/2019 | Lv et al. |

FOREIGN PATENT DOCUMENTS

| | | | |
|---|---|---|---|
| CN | 108712655 A | 10/2018 | |
| WO | 2017197828 A1 | 11/2017 | |
| WO | WO-2021033749 A1 * | 2/2021 | ............. H04N 19/70 |

OTHER PUBLICATIONS

Xuguang Zuo et al, Library Based Coding for Videos with Repeated Scenes, 2015 Picture Coding Symposium (PCS), Jul. 30, 2015, 5 pages.
Nuno Vasconcelo et al, Library-based coding: a representation for efficient video compression and retrieval, Proceedings DCC 97. Data Compression Conference, Mar. 1997, 11 pages.
Xuguang Zuo et al, Scene-library-based video codingscheme exploiting long-term temporal correlation, Journal of Electronic Imaging 26(4), 043026 (Jul. Aug. 2017), 13 pages.
"Series H: Audiovisual and Multimedia Systems, Infrastructure of audiovisual services—Coding of moving video, Video coding for low bit rate communication," ITU-T H.263, International Telecommunication Union, Geneva, Switzerland, total 226 pages (2005).
"Series H: Audiovisual and Multimedia Systems, Infrastructure of audiovisual services—Coding of moving video, Advanced video coding for generic audiovisual services," ITU-T H.264, International Telecommunication Union, Geneva, Switzerland, total 812 pages (Apr. 2017).
"Series H: Audiovisual and Multimedia Systems Infrastructure of audiovisual services—Coding of moving video, High efficiency video coding," ITU-T H.265, International Telecommunication Union, Geneva, Switzerland, total 692 pages (Feb. 2018).

* cited by examiner

VIDEO CODING AND DECODING METHODS AND DEVICES USING A LIBRARY PICTURE BITSTREAM

CROSS-REFERENCE TO RELATED APPLICATIONS

This is a continuation of International Patent Application No. PCT/CN2020/070592 filed on Jan. 7, 2020, which claims priority to Chinese Patent Application No. 201910018725.6 filed on Jan. 8, 2019 and also claims priority to Chinese Patent Application No. 201910888383.3 filed on Sep. 19, 2019. All of the aforementioned patent applications are hereby incorporated by reference in their entireties.

TECHNICAL FIELD

This application relates to the field of coding technologies, and in particular, to a video decoding method, a video encoding method, an apparatus, a device, and a storage medium.

BACKGROUND

With development of video coding technologies, there are more video coding methods, including a library-based coding method. After encoding a video, an encoder side obtains a library picture bitstream and a video bitstream that refers to the library picture bitstream. Correspondingly, a decoder side needs to decode the library picture bitstream and the video bitstream, to restore the video.

A related technology provides a decoding method. In this method, after a library picture bitstream and a video bitstream that are encoded by an encoder side are obtained, a first decoder is invoked to decode the library picture bitstream, to obtain a decoded library picture bitstream. Then, a second decoder is invoked to decode the video bitstream based on the decoded library picture bitstream.

It can be learned that, in the related technology, two decoders need to be invoked to decode the library picture bitstream and the video bitstream respectively. Therefore, a decoding process in the related technology is not flexible, and decoding efficiency is low.

SUMMARY

Embodiments of this application provide a video decoding method, a video encoding method, an apparatus, a device, and a storage medium, to resolve problems that a related-technology encoding process is not flexible and decoding efficiency is low.

According to a first aspect, an embodiment of this application provides a video decoding method. The method includes, if a video bitstream is allowed to be decoded by referencing a library picture corresponding to a library picture bitstream, parsing a first flag from the video bitstream, and when a value of the first flag is a first value, using a value of a target parameter in a sequence header of the video bitstream as a value of a target parameter of the library picture bitstream referenced by the video bitstream.

Optionally, the method may further include, when a value of the first flag is a first value, using a value of a target parameter in a sequence header of the video bitstream as a value of a target parameter of the library picture bitstream referenced by the video bitstream, and reconstructing, based on the value of the target parameter of the library picture bitstream referenced by the video bitstream and the library picture bitstream referenced by the video bitstream, to obtain the library picture corresponding to the library picture bitstream referenced by the video bitstream.

It should be noted that "referencing" may be understood as "allowing to reference".

"If a video bitstream is allowed to be decoded by referencing a library picture corresponding to a library picture bitstream" may be understood as "if a video bitstream needs to be decoded by referencing a library picture corresponding to a library picture bitstream".

Optionally, if the target parameter is decoding capability information, when the value of the first flag is the first value, reconstructing is performed, not based on a value of the decoding capability information of the library picture bitstream, but directly by invoking a decoder of the video bitstream to decode the library picture bitstream referenced by the video bitstream, to obtain the library picture corresponding to the library picture bitstream referenced by the video bitstream.

In an example embodiment, the method further includes reconstructing, based on the video bitstream and the library picture corresponding to the library picture bitstream referenced by the video bitstream, to obtain a video picture corresponding to the video bitstream.

In an example embodiment, the first flag is located in the sequence header of the video bitstream.

In an example embodiment, the first flag includes a same parameter flag, and the same parameter flag is used to indicate whether the value of the target parameter of the library picture bitstream referenced by the video bitstream is the same as the value of the target parameter in the sequence header of the video bitstream. The target parameter in the sequence header of the video bitstream includes the decoding capability information of the video bitstream.

In an example embodiment, the value of the same parameter flag being the first value indicates that the value of the target parameter of the library picture bitstream is the same as the value of the target parameter in the sequence header of the video bitstream.

In an example embodiment, the value of the same parameter flag being a second value indicates that the value of the target parameter of the library picture bitstream may be different from the value of the target parameter in the sequence header of the video bitstream, indicates that the value of the target parameter of the library picture bitstream is not necessarily the same as or is not required to be the same as the value of the target parameter in the sequence header of the video bitstream, or indicates that the value of the target parameter of the library picture bitstream is different from the value of the target parameter in the sequence header of the video bitstream.

In an example embodiment, the target parameter includes the decoding capability information, and reconstructing, based on the value of the target parameter of the library picture bitstream referenced by the video bitstream and the library picture bitstream referenced by the video bitstream, to obtain the library picture corresponding to the library picture bitstream referenced by the video bitstream includes determining whether a decoding capability of a to-be-used decoder satisfies a requirement indicated by the value of the decoding capability information of the library picture bitstream referenced by the video bitstream, and when the decoding capability of the to-be-used decoder satisfies the requirement indicated by the value of the decoding capability information of the library picture bitstream referenced by the video bitstream, parsing, by using the to-be-used decoder, the library picture bitstream referenced by the video bitstream, and reconstructing to obtain the library picture corresponding to the library picture bitstream referenced by the video bitstream.

In an example embodiment, if the video bitstream is allowed to be decoded by referencing the library picture corresponding to the library picture bitstream, parsing a first flag from the video bitstream includes parsing a library picture reference flag from the video bitstream, where the library picture reference flag is used to indicate whether the video bitstream is allowed to be decoded by referencing the library picture corresponding to the library picture bitstream, and if a value of the library picture reference flag indicates that the video bitstream is allowed to be decoded by referencing the library picture corresponding to the library picture bitstream, parsing the first flag from the video bitstream.

In another example embodiment, the library picture reference flag may also be used to indicate whether the video bitstream needs to be decoded by referencing the library picture corresponding to the library picture bitstream. Further, if the value of the library picture reference flag indicates that the video bitstream needs to be decoded by referencing the library picture corresponding to the library picture bitstream, the first flag is parsed from the video bitstream.

In an example embodiment, the video bitstream includes a library picture flag, a value of the library picture flag is a second value, and the library picture flag being the second value indicates that the video bitstream is not the library picture bitstream. It should be noted that the library picture flag may be located in the sequence header of the video bitstream.

In an example embodiment, the method further includes obtaining the library picture flag from a current bitstream, and using the current bitstream as the video bitstream only when the value of the library picture flag indicates that the video bitstream is not the library picture bitstream, and parsing the library picture reference flag from the video bitstream.

In an example embodiment, the target parameter includes the decoding capability information, and the method further includes parsing the decoding capability information of the library picture bitstream from a video parameter set (VPS) of the video bitstream, parsing the decoding capability information of the library picture bitstream from a sequence parameter set (SPS) of the video bitstream, or parsing the decoding capability information of the library picture bitstream from the sequence header of the video bitstream.

In an example embodiment, the method further includes parsing the target parameter of the library picture bitstream from the VPS of the video bitstream, parsing the target parameter of the library picture bitstream from the SPS of the video bitstream, or parsing the target parameter of the library picture bitstream from the sequence header of the video bitstream.

In an example embodiment, the target parameter includes the decoding capability information, the decoding capability information of the video bitstream includes a profile flag and a level flag, the profile flag is used to indicate a profile to which the video bitstream belongs, and the level flag is used to indicate a level to which the video bitstream belongs, and using a value of a target parameter in a sequence header of the video bitstream as a value of a target parameter of the library picture bitstream includes using the profile flag and the level flag as the decoding capability information of the library picture bitstream referenced by the video bitstream.

According to a second aspect, a video encoding method is provided. The method includes, if a video picture is allowed to be encoded by referencing a library picture corresponding to a library picture bitstream, encoding the video picture by referencing the library picture corresponding to the library picture bitstream to obtain encoded data, and adding a first flag to the encoded data to obtain a video bitstream, where a value of the first flag being a first value indicates that a value of a target parameter in a sequence header of the video bitstream is used as a value of a target parameter of the library picture bitstream referenced by the video bitstream.

Optionally, the value of the first flag being the first value may also indicate that the value of the target parameter in the sequence header of the video bitstream is the same as the value of the target parameter in a sequence header of the library picture bitstream referenced by the video bitstream.

In an example embodiment, the first flag is located in the sequence header of the video bitstream.

In an example embodiment, the encoded data includes decoding capability information.

In an example embodiment, the first flag includes a same parameter flag, and the same parameter flag is used to indicate whether the value of the target parameter of the library picture bitstream referenced by the video bitstream is the same as the value of the target parameter in the sequence header of the video bitstream, and the value of the same parameter flag being the first value indicates that the value of the target parameter of the library picture bitstream is the same as the value of the target parameter in the sequence header of the video bitstream. The target parameter in the sequence header of the video bitstream may include the decoding capability information of the video bitstream.

In an example embodiment, the video bitstream further includes a library picture reference flag, and the library picture reference flag is used to indicate whether the video bitstream is allowed to be decoded by referencing the library picture corresponding to the library picture bitstream.

In an example embodiment, the video bitstream further includes a library picture flag, and a value of the library picture flag being a second value indicates that the video bitstream is not the library picture bitstream.

In an example embodiment, the target parameter includes the decoding capability information, and the decoding capability information is located in a VPS of the encoded data, is located in an SPS of the encoded data, or is located in the sequence header of the video bitstream.

In an example embodiment, the target parameter is located in the VPS of the encoded data, or is located in the SPS of the encoded data, or is located in the sequence header of the video bitstream.

In an example embodiment, the target parameter includes decoding capability information, the decoding capability information includes a profile flag and a level flag, the profile flag is used to indicate a profile to which the library picture bitstream belongs, and the level flag is used to indicate a level to which the library picture bitstream belongs. The profile flag and the level flag are used to indicate the decoding capability information of the library picture bitstream.

According to a third aspect, a video decoding apparatus is further provided. The apparatus includes a parsing module configured to, if a video bitstream is allowed to be decoded by referencing a library picture corresponding to a library picture bitstream, parse a first flag from the video bitstream, and when a value of the first flag is a first value, use a value of a target parameter in a sequence header of the video bitstream as a value of a target parameter of the library picture bitstream referenced by the video bitstream.

Optionally, the parsing module is also configured to if the video bitstream is allowed to be decoded by referencing the library picture corresponding to the library picture bitstream, parse the first flag from the video bitstream, and when a value of the first flag is the first value, use the value of the target parameter in the sequence header of the video bitstream as the value of the target parameter of the library picture bitstream referenced by the video bitstream.

Optionally, the apparatus may further include a reconstruction module configured to, when the value of the first flag is the first value, use the value of the target parameter in the sequence header of the video bitstream as the value of the target parameter of the library picture bitstream referenced by the video bitstream, and reconstruct, based on the value of the target parameter of the library picture bitstream referenced by the video bitstream and the library picture bitstream referenced by the video bitstream, to obtain the library picture corresponding to the library picture bitstream referenced by the video bitstream.

Optionally, the reconstruction module may also be configured to reconstruct, based on the value of the target parameter of the library picture bitstream referenced by the video bitstream and the library picture bitstream referenced by the video bitstream, the library picture corresponding to the library picture bitstream referenced by the video bitstream.

In an example embodiment, the reconstruction module is further configured to reconstruct, based on the video bitstream and the library picture corresponding to the library picture bitstream referenced by the video bitstream, to obtain a video picture corresponding to the video bitstream.

In an example embodiment, the first flag is located in the sequence header of the video bitstream.

In an example embodiment, the first flag includes a same parameter flag, and the same parameter flag is used to indicate whether the value of the target parameter of the library picture bitstream referenced by the video bitstream is the same as the value of the target parameter in the sequence header of the video bitstream, and the value of the same parameter flag being the first value indicates that the value of the target parameter of the library picture bitstream is the same as the value of the target parameter in the sequence header of the video bitstream.

In an example embodiment, the target parameter includes decoding capability information, and the reconstruction module is configured to determine whether a decoding capability of a to-be-used decoder satisfies a requirement indicated by a value of the decoding capability information of the library picture bitstream referenced by the video bitstream, and when the decoding capability of the to-be-used decoder satisfies the requirement indicated by the value of the decoding capability information of the library picture bitstream referenced by the video bitstream, parse, by using the to-be-used decoder, the library picture bitstream referenced by the video bitstream, and reconstruct to obtain the library picture corresponding to the library picture bitstream referenced by the video bitstream.

In an example embodiment, the parsing module is configured to parse a library picture reference flag from the video bitstream, where the library picture reference flag is used to indicate whether the video bitstream is allowed to be decoded by referencing the library picture corresponding to the library picture bitstream, and if a value of the library picture reference flag indicates that the video bitstream is allowed to be decoded by referencing the library picture corresponding to the library picture bitstream, parse the first flag from the video bitstream.

In an example embodiment, a library picture flag is parsed from the video bitstream, a value of the library picture flag is a second value, and the library picture flag being the second value indicates that the video bitstream is not the library picture bitstream.

In an example embodiment, the parsing module is further configured to obtain the library picture flag from a current bitstream, and use the current bitstream as the video bitstream only when the value of the library picture flag indicates that the video bitstream is not the library picture bitstream, and parse the library picture reference flag from the video bitstream.

In an example embodiment, the target parameter includes the decoding capability information, and the parsing module is further configured to parse the decoding capability information of the library picture bitstream from a VPS of the video bitstream, parse the decoding capability information of the library picture bitstream from an SPS of the video bitstream, or parse the decoding capability information of the library picture bitstream from the sequence header of the video bitstream.

In an example embodiment, the parsing module is further configured to parse the target parameter of the library picture bitstream from the VPS of the video bitstream, parse the target parameter of the library picture bitstream from the SPS of the video bitstream, or parse the target parameter of the library picture bitstream from the sequence header of the video bitstream.

In an example embodiment, the target parameter includes decoding capability information, the decoding capability information of the video bitstream includes a profile flag and a level flag, the profile flag is used to indicate a profile to which the video bitstream belongs, and the level flag is used to indicate a level to which the video bitstream belongs, and the parsing module is configured to use the profile flag and the level flag as the decoding capability information of the library picture bitstream referenced by the video bitstream.

According to a fourth aspect, a video encoding apparatus is provided. The apparatus includes an encoding module configured to, if a video picture is allowed to be encoded by referencing a library picture corresponding to a library picture bitstream, encode the video picture by referencing the library picture corresponding to the library picture bitstream to obtain encoded data, and an adding module configured to add a first flag to the encoded data to obtain a video bitstream, where a value of the first flag being a first value indicates that a value of a target parameter in a sequence header of the video bitstream is used as a value of a target parameter of the library picture bitstream referenced by the video bitstream.

Optionally, the value of the first flag being the first value may also indicate that the value of the target parameter in the sequence header of the video bitstream is the same as the value of the target parameter in a sequence header of the library picture bitstream referenced by the video bitstream.

In an example embodiment, the first flag is located in the sequence header of the video bitstream.

In an example embodiment, the first flag includes a same parameter flag, and the same parameter flag is used to indicate whether the value of the target parameter of the library picture bitstream referenced by the video bitstream is the same as the value of the target parameter in the sequence header of the video bitstream, and the value of the same parameter flag being the first value indicates that the value of the target parameter of the library picture bitstream is the same as the value of the target parameter in the sequence header of the video bitstream.

In an example embodiment, the video bitstream further includes a library picture reference flag, and the library picture reference flag is used to indicate whether the video bitstream is allowed to be decoded by referencing the library picture corresponding to the library picture bitstream.

In an example embodiment, the video bitstream further includes a library picture flag, and a value of the library picture flag being a second value indicates that the video bitstream is not the library picture bitstream.

In an example embodiment, the target parameter includes decoding capability information, and the decoding capability information is located in a VPS of the encoded data, is located in an SPS of the encoded data, or is located in the sequence header of the video bitstream.

In an example embodiment, the target parameter includes the decoding capability information, and the target parameter is located in the VPS of the encoded data, is located in the SPS of the encoded data, or is located in the sequence header of the video bitstream.

In an example embodiment, the target parameter includes decoding capability information, the decoding capability information includes a profile flag and a level flag, the profile flag is used to indicate a profile to which the library picture bitstream belongs, and the level flag is used to indicate a level to which the library picture bitstream belongs.

According to a fifth aspect, an embodiment of this application provides a video decoding device, including a memory and a processor. The memory stores at least one instruction, and the at least one instruction is loaded and executed by the processor, to implement the method in any one of the first aspect of the embodiments of this application or the possible implementations of the first aspect.

According to a sixth aspect, an embodiment of this application provides a video encoding device, including a memory and a processor. The memory stores at least one instruction, and the at least one instruction is loaded and executed by the processor, to implement the method in any one of the second aspect of the embodiments of this application or the possible implementations of the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

According to a seventh aspect, a computer program product is provided. The computer program product includes computer program code. When the computer program code is run by a computer, the computer is enabled to perform the methods in the foregoing aspects.

According to an eighth aspect, a readable storage medium is provided. The readable storage medium stores a program or instructions. When the program or the instructions is/are run on a computer, the methods in the foregoing aspects are performed.

According to a ninth aspect, a chip is provided. The chip includes a processor configured to invoke and run instructions stored in the memory, communications equipment in which the chip is installed is enabled to perform the methods in the foregoing aspects.

According to a tenth aspect, another chip is provided. The chip includes an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

It should be understood that technical solutions in the second to the tenth aspects of the embodiments of this application are consistent with technical solutions in the first aspect of the embodiments of this application, and beneficial effects achieved by the aspects and corresponding feasible implementations are similar. Details are not described again.

According to an eleventh aspect, an embodiment of this application provides a video decoding method, including parsing a library picture reference flag from a video bitstream, where the library picture reference flag is used to indicate whether the video bitstream including the library picture reference flag is allowed to be decoded by referencing a library picture corresponding to a library picture bitstream, and when the library picture reference flag indicates that the video bitstream is allowed to be decoded by referencing the library picture corresponding to the library picture bitstream, obtaining the library picture corresponding to the library picture bitstream, and decoding the video bitstream based on the library picture corresponding to the library picture bitstream.

In an example embodiment, obtaining the library picture corresponding to the library picture bitstream includes parsing a same standard flag from the video bitstream, where the same standard is used to indicate whether a standard used for decoding the library picture bitstream is the same as a standard used for decoding the video bitstream, and when the same standard indicates that the standard used for decoding the library picture bitstream is the same as the standard used for decoding the video bitstream, obtaining the library picture bitstream, and decoding the library picture bitstream to obtain the library picture corresponding to the library picture bitstream.

In an example embodiment, the same standard flag is located in a VPS of the video bitstream, an SPS of the video bitstream, or a sequence header of the video bitstream.

In an example embodiment, obtaining the library picture corresponding to the library picture bitstream includes obtaining the library picture bitstream, and decoding the library picture bitstream to obtain the library picture corresponding to the library picture bitstream.

In an example embodiment, decoding the library picture bitstream to obtain the library picture corresponding to the library picture bitstream includes parsing decoding capability information of the library picture bitstream from the video bitstream, and when a decoding capability of a decoder that currently decodes the video bitstream satisfies a requirement of the decoding capability information, decoding the library picture bitstream to obtain the library picture corresponding to the library picture bitstream.

In an example embodiment, the decoding capability information includes a profile to which the library picture bitstream belongs and/or a level to which the library picture bitstream belongs, and the decoding capability information including a profile to which the library picture bitstream belongs and/or a level to which the library picture bitstream belongs indicates a decoding capability required for decoding the library picture bitstream.

In an example embodiment, the video bitstream includes a library picture flag or information about the library picture flag, and the information about the library picture flag is used to indicate the library picture flag, and a value of the library picture flag is used to indicate that the video bitstream is not the library picture bitstream.

In an example embodiment, the library picture reference flag is parsed from the video bitstream only when the value of the library picture flag is used to indicate that the video bitstream is not the library picture bitstream.

In an example embodiment, the video bitstream includes a same parameter flag, and a value of the same parameter flag is used to indicate whether a value of a parameter other than the library picture flag in a sequence header of a library picture bitstream is the same as a value of a parameter other than the library picture flag in the sequence header of the video bitstream.

In an example embodiment, the library picture reference flag is located in the VPS of the video bitstream, the SPS of the video bitstream, or the sequence header of the video bitstream.

According to a twelfth aspect, an embodiment of this application provides a video decoding method, including parsing, from a video bitstream, decoding capability information of a library picture bitstream, when a decoding capability of a decoder that currently decodes the video bitstream satisfies a requirement of the decoding capability information, obtaining a library picture corresponding to the library picture bitstream, and decoding the video bitstream based on the library picture corresponding to the library picture bitstream.

According to a thirteenth aspect, an embodiment of this application provides a video decoding device, including several functional units configured to implement the method in the first aspect.

For example, the video decoding device may include a parsing unit configured to parse a library picture reference flag from a video bitstream, where the library picture reference flag is used to indicate whether a video bitstream including the library picture reference flag is allowed to be decoded by referencing a library picture corresponding to the library picture bitstream, and a reconstruction unit configured to, if the library picture reference flag indicates that the video bitstream is allowed to be decoded by referencing the library picture corresponding to the library picture bitstream, obtain the library picture corresponding to the library picture bitstream, and decode the video bitstream based on the library picture corresponding to the library picture bitstream.

According to a fourteenth aspect, an embodiment of this application provides a video decoding device, including several functional units configured to implement the method in the second aspect. For example, the video decoding device may include a parsing unit configured to parse decoding capability information of a library picture bitstream from a video bitstream, and a reconstruction unit configured to, when a decoding capability of a decoder that currently decodes the video bitstream satisfies a requirement of the decoding capability information, obtain a library picture corresponding to the library picture bitstream, and decode the video bitstream based on the library picture corresponding to the library picture bitstream.

According to a fifteenth aspect, an embodiment of this application provides a decoding device, including a non-volatile memory and a processor that are coupled to each other. The processor invokes program code stored in the memory to perform some or all steps of the method in the first aspect or the second aspect.

According to a sixteenth aspect, an embodiment of this application provides a computer-readable storage medium. The computer-readable storage medium stores program code, and the program code includes instructions used to perform some or all steps of the method in the first aspect or the second aspect.

According to a seventeenth aspect, an embodiment of this application provides a computer program product. When the computer program product runs on a computer, the computer is enabled to perform some or all of the steps of the method in the eleventh aspect or the twelfth aspect.

In conclusion, the technical solutions provided in this application have at least the following beneficial effects.

In this application, the video bitstream is used to carry the decoding capability information. When the video bitstream is allowed to be decoded by referencing the library picture corresponding to the library picture bitstream, the first flag is parsed from the video bitstream. When the first flag is the first value, the value of the target parameter in the sequence header of the video bitstream is used as the value of the target parameter of the library picture bitstream. The library picture is reconstructed based on the library picture bitstream and the value of the target parameter of the library picture bitstream, and then the video picture corresponding to the video bitstream may be reconstructed based on the library picture and the video bitstream. Therefore, according to the solutions provided in the embodiments of this application, parameters are shared between the library picture bitstream and the video bitstream, and decoding efficiency is high.

DESCRIPTION OF EMBODIMENTS

Figure 1A:
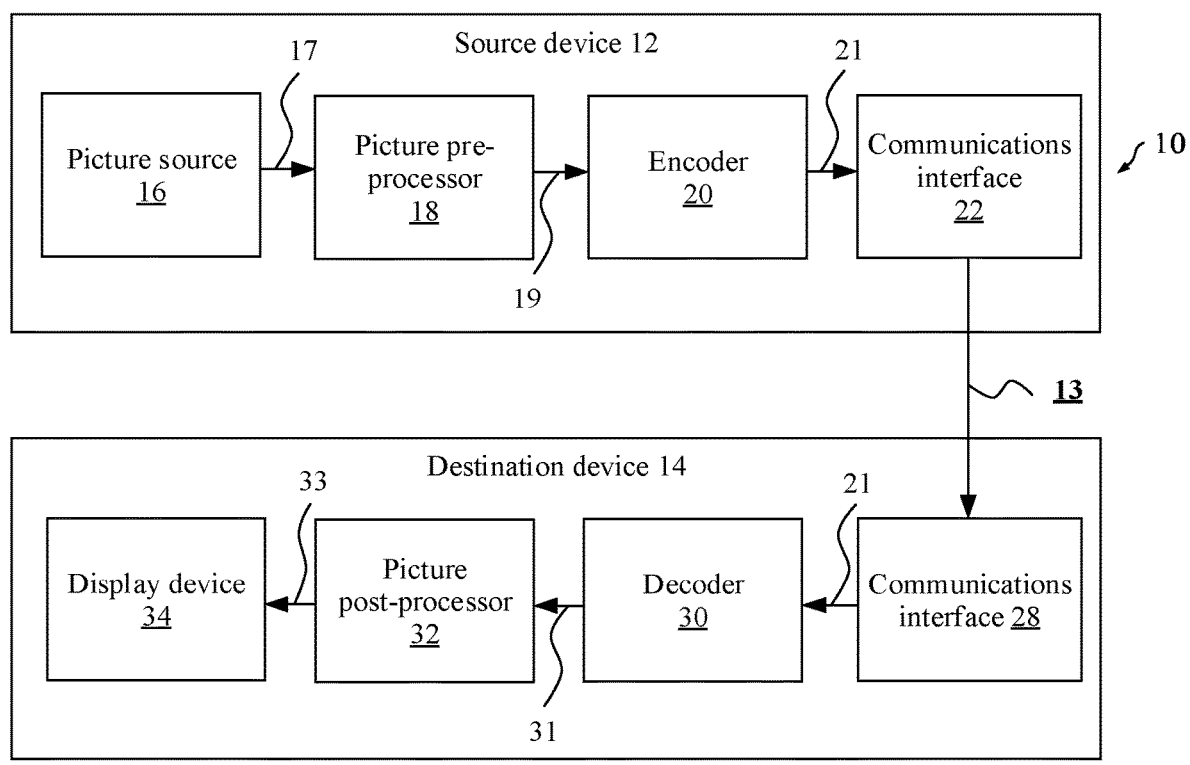
FIG. 1A is a block diagram of an example of a video encoding and decoding system according to an embodiment of this application.

The following describes the embodiments of this application with reference to the accompanying drawings in the embodiments of this application. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that a disclosure with reference to a described method may also hold true for a corresponding device or system configured to perform the method and vice versa. For example, it should be understood that disclosed content with reference to described methods may also hold true for a corresponding device or system configured to perform the method, and vice versa. For example, if one or more specific method steps are described, a corresponding device may include one or more units such as functional units for performing the described one or more method steps (for example, one unit performs the one or more steps, or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include a step used to perform one or more functionalities of one or more units (for example, one step used to perform one or more functionalities of one or more units, or a plurality of steps, each of which is used perform one or more functionalities of one or more units in a plurality of units), even if such one or more of steps are not explicitly described or illustrated in the accompanying drawings. Further, it should be understood that features of the various example embodiments and/or aspects described in this specification may be combined with each other, unless otherwise specified.

The technical solutions related to the embodiments of this application may not only be applied to video coding standards, for example, H.264 and High Efficiency Video Coding (HEVC), but also be applied to future video coding standards, for example, the H.266 standard. Terms used in implementations of this application are merely intended to explain specific embodiments of this application, and are not intended to limit this application. The following first briefly describes related concepts in the embodiments of this application.

Video coding typically refers to processing of a sequence of pictures, where the sequence of pictures forms a video or a video sequence. In the field of video coding, the terms "picture", "frame", and "image" may be used as synonyms. Video encoding is performed on a source side, and usually includes processing (for example, through compression) a picture sequence to reduce an amount of data for representing the picture sequence, for more efficient storage and/or transmission. Video decoding is performed on a destination side, and usually includes inverse processing in comparison with the encoder to reconstruct a picture sequence.

Further, a picture is further split into slices (slice), and a slice is further split into blocks (block). Video coding is performed by block. In some new video coding standards, the concept "block" is further expanded. For example, in the H.264 standard, there is a macro block (MB), and the macro block may be further split into a plurality of partitions (partition) that can be used for predictive coding. In the HEVC standard, a plurality of block units is classified by functions according to basic concepts such as coding unit (CU), prediction unit (PU), and transform unit (TU) are used, and are described by using a new tree-based structure. For example, a CU may be partitioned into smaller CUs based on a quadtree, and the smaller CU may further be partitioned, to generate a quadtree structure. The CU is a basic unit for partitioning and encoding a coded picture. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit for transforming a prediction residual. However, in essence, all of the CU, the PU, and the TU are conceptually blocks (or picture blocks).

For example, in HEVC, a coding tree unit (CTU) is partitioned into a plurality of CUs by using a quadtree structure represented as a coding tree. A decision on whether to code a picture area by using inter-picture (temporal) or intra-picture (spatial) prediction is made at a CU level. Each CU may further be split into one, two, or four PUs based on a PU splitting pattern. In one PU, a same prediction process is applied, and related information is transmitted to the decoder on a PU basis. After obtaining a residual block by applying the prediction process based on the PU splitting pattern, the CU may be partitioned into TUs based on another quadtree structure similar to the coding tree used for the CU. In the development of video compression technologies, a quadtree plus binary tree (QTBT) partition frame is used to partition a coding block. In a QTBT block structure, the CU may be square or rectangular.

In this specification, for ease of description and understanding, a to-be-encoded picture block in a current coded picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed to find an optimal reference block. The optimal reference block provides prediction for the current block, and this block is referred to as a prediction block.

In a case of lossless video coding, an original picture sequence may be reconstructed. In other words, the reconstructed picture sequence has same quality as the original picture sequence (assuming that no transmission loss or other data loss occurs during storage or transmission). In a case of lossy video coding, further compression is performed through, for example, quantization, to reduce an amount of data required for representing the picture sequence. The picture sequence cannot be completely reconstructed on a decoder side. In other words, quality of the reconstructed picture sequence is lower or poorer than that of the original picture sequence.

Several H.261 video coding standards are used for "lossy hybrid video codecs" (in other words, spatial and temporal prediction in a sample domain is combined with two-dimensional (2D) transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The following describes a system architecture applicable to the embodiments of this application. Refer to FIG. 1A. FIG. 1A is a schematic block diagram of an example of a video encoding and decoding system 10 to which an embodiment of this application is applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an electrically erasable programmable ROM (EEPROM), a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a "smart" phone, a television, a camera, a display apparatus, a digital media player, a video game console, an in-vehicle computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation, the encoder 20, the picture source 16, the picture preprocessor 18, and the communications interface 22 may be hardware components in the source device 12, or may be software programs in the source device 12. Descriptions are separately provided as follows.

The picture source 16 may include or be any type of picture capturing device configured to, for example, capture a real-world picture, and/or any type of device for generating a picture or comment (for screen content encoding, some text on a screen is also considered as a part of a to-be-encoded picture or image), for example, a computer graphics processor configured to generate a computer animation picture, or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. A quantity of samples in horizontal and vertical directions (or axes) of the array or the picture defines a size and/or a resolution of the picture. For representation of a color, typically three color components are used. For example, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (or sometimes indicated by L) and two chroma components indicated by U and V. The luminance (luma) component Y represents brightness or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in a red, green, and blue (RGB) format may be transformed or converted into a YUV format and vice versa. This process is also referred to as color conversion or transformation. If a picture is monochrome, the picture may include only a luma sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform the embodiments described below, to implement the video encoding method described in this application.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bi-directional communications interfaces, and may be configured to, for example, send and receive messages to establish a connection, and acknowledge and exchange any other information related to a communication link and/or data transmission such as encoded picture data transmission.

The decoder 30 (or referred to as a decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform the embodiments described below, to implement the video decoding method described in this application.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or include any type of display for presenting a reconstructed picture, for example, an integrated or external display or monitor. For example, the display may include a liquid-crystal display (LCD), an organic light-emitting diode (LED) (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video bitstreaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, digital signal processors (DSPs), application-specific integrated circuits (ASICs), field-programmable gate arrays (FPGAs), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the techniques of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode and store data to the memory, and/or a video decoding device may retrieve and decode data from the memory. In some examples, the encoding and the decoding are performed by devices that do not communicate with one another, but simply encode data to the memory and/or retrieve and decode data from the memory.

Figure 1B:
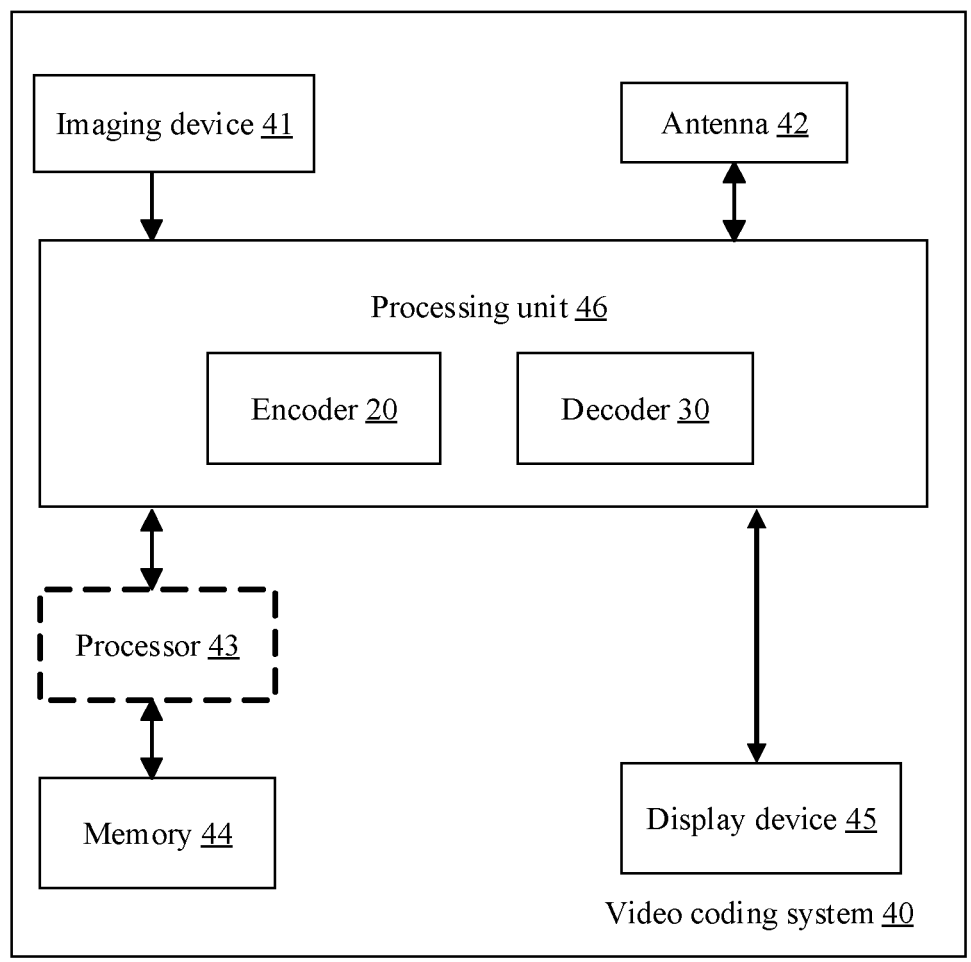
FIG. 1B is a block diagram of an example of a video coding system according to an embodiment of this application.

Refer to FIG. 1B. FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of this application. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include ASIC logic, a graphics processing unit, a general-purpose processor, and the like. The video coding system 40 may also include the optional processor 43. The optional processor 43 may similarly include ASIC logic, a graphics processor, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be a memory of any type, for example, a volatile memory (for example, a static random access memory (SRAM) or a dynamic random access memory (DRAM)) or a nonvolatile memory (for example, a flash memory). In a non-limitative example, the memory 44 may be implemented as a cache memory. In some examples, the logic circuit 47 may access the memory 44 (for example, for implementation of a picture buffer). In another example, the logic circuit 47 and/or the processing unit 46 may include a memory (for example, a cache) for implementation of a picture buffer or the like.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by the processing unit 46 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that the encoder 20 and the decoder 30 in this embodiment of this application may be an encoder and a decoder corresponding to video standard protocols such as H.263, H.264, HEVC, Moving Picture Experts Group (MPEG)-2, MPEG-4, VP8, and VP9 or next-generation video standard protocols, such as H.266 or an Audio Video Coding Standard (AVS) 3.

Figure 2:
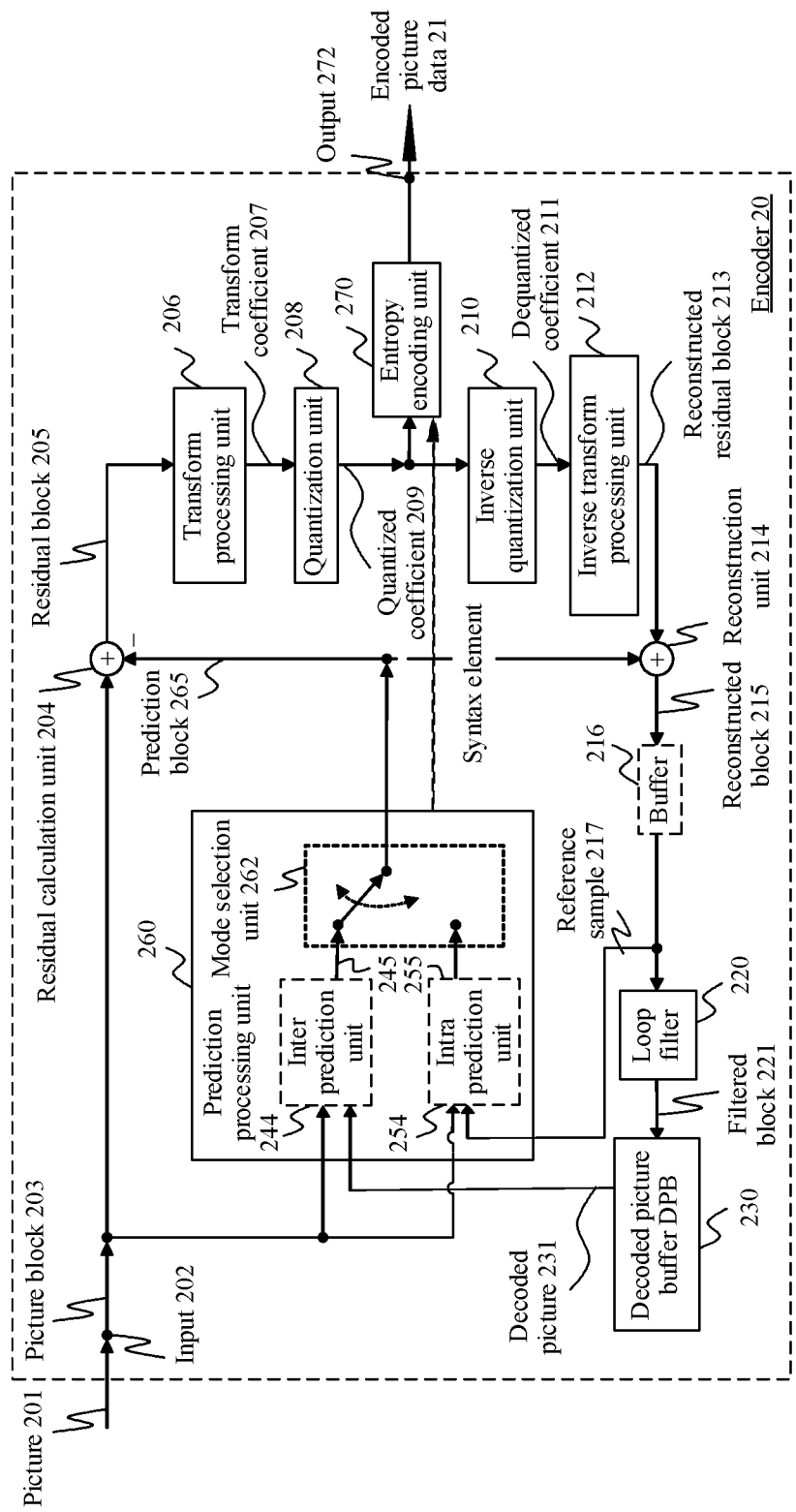
FIG. 2 is a block diagram of an example structure of an encoder according to an embodiment of this application.

FIG. 2 is a schematic/conceptual block diagram of an example of an encoder 20 according to an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the DPB 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not depicted in FIG. 2) configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. For example, a specific scale factor is specified for the inverse transform by, for example, the inverse transform processing unit 212 at a decoder 30 side (and a corresponding inverse transform by, for example, the inverse transform processing unit 212 at an encoder 20 side), and correspondingly, a corresponding scale factor may be specified for the forward transform by the transform processing unit 206 at the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the QP. For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step) or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where loss increases with an increasing quantization step.

The inverse quantization unit 210 is configured to apply the inverse quantization of the quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, a DCT or a DST, to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or buffer 216) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 2), and/or so that, for example, the buffer unit 216 and the DPB 230 form one buffer. In other embodiments, a filtered block 221 and/or a block or a sample from the DPB 230 (the block or sample is not shown in FIG. 2) are/is used as an input or a basis for the intra prediction unit 254.

The loop filter unit 220 (or loop filter 220) is configured to filter the reconstructed block 215 to obtain a filtered block 221, to smooth pixel transitions or improve video quality. The loop filter unit 220 is intended to represent one or more loop filters including, for example, a deblocking filter, a sample-adaptive offset (SAO) filter, and another filter such as a bilateral filter, an adaptive loop filter (ALF), a sharpening or smoothing filter, or a collaborative filter. Although the loop filter unit 220 is shown as an in-loop filter in FIG. 2, in another implementation, the loop filter unit 220 may be implemented as a post-loop filter. The filtered block 221 may also be referred to as a filtered reconstructed block 221. The DPB 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The DPB 230 may be a reference picture memory that stores reference picture data for encoding video data by the encoder 20. The DPB 230 may be formed by any one of a variety of memory devices such as a DRAM (including a synchronous DRAM (SDRAM), a magnetoresistive RAM (MRAM), a resistive RAM (RRA)), or another type of memory device. The DPB 230 and the buffer 216 may be provided by a same memory device or separate memory devices. In an example, the DPB 230 is configured to store the filtered block 221. The DPB 230 may further be configured to store another previously filtered block, for example, a previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the DPB 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the DPB 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a direct current (DC) (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (that is, for example, at least some decoded pictures stored in the DBP 230, as described above) and other inter prediction parameters, for example, depends on whether the entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an Advanced Motion Vector Prediction (AMVP) mode and a merge mode. In a specific implementation, the set of inter prediction modes may include an improved control point-based AMVP mode and an improved control point-based merge mode in the embodiments of this application. In an example, the intra prediction unit 254 may be configured to perform any combination of inter prediction technologies described below.

In addition to the foregoing prediction modes, a skip mode and/or a direct mode may also be used in this embodiment of this application.

The prediction processing unit 260 may be further configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include extracting or generating a prediction block based on a motion/block vector determined through motion estimation (interpolation may be performed at a sub-sample precision level). Interpolation filtering may generate additional pixel samples from known pixel samples, thereby potentially increasing a quantity of candidate prediction blocks that may be used to code a picture block. Upon receiving a motion vector for a PU of the current picture block, a motion compensation unit 246 may locate a prediction block to which the motion vector points in one of the reference picture lists. The motion compensation unit 246 may further generate syntax elements associated with a block and a video slice, for decoding a picture block of the video slice by the decoder 30.

Further, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, namely, information indicating the selected intra-prediction mode for the block, to the entropy encoding unit 270. In an example, the intra prediction unit 254 may be configured to perform any combination of intra prediction technologies.

Further, the intra prediction unit 254 may transmit syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or avoid applying) an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based CABAC (SBAC), probability interval partitioning entropy (PIPE) coding, or another entropy coding methodology or technique) on one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may further be configured to entropy encode another syntax element for a current video slice that is being encoded.

Another structural variant of the video encoder 20 can be used to encode a video bitstream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

It should be understood that another structural variant of the video encoder 20 may be used to encode a video bitstream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be used selectively enabled.

Figure 3:
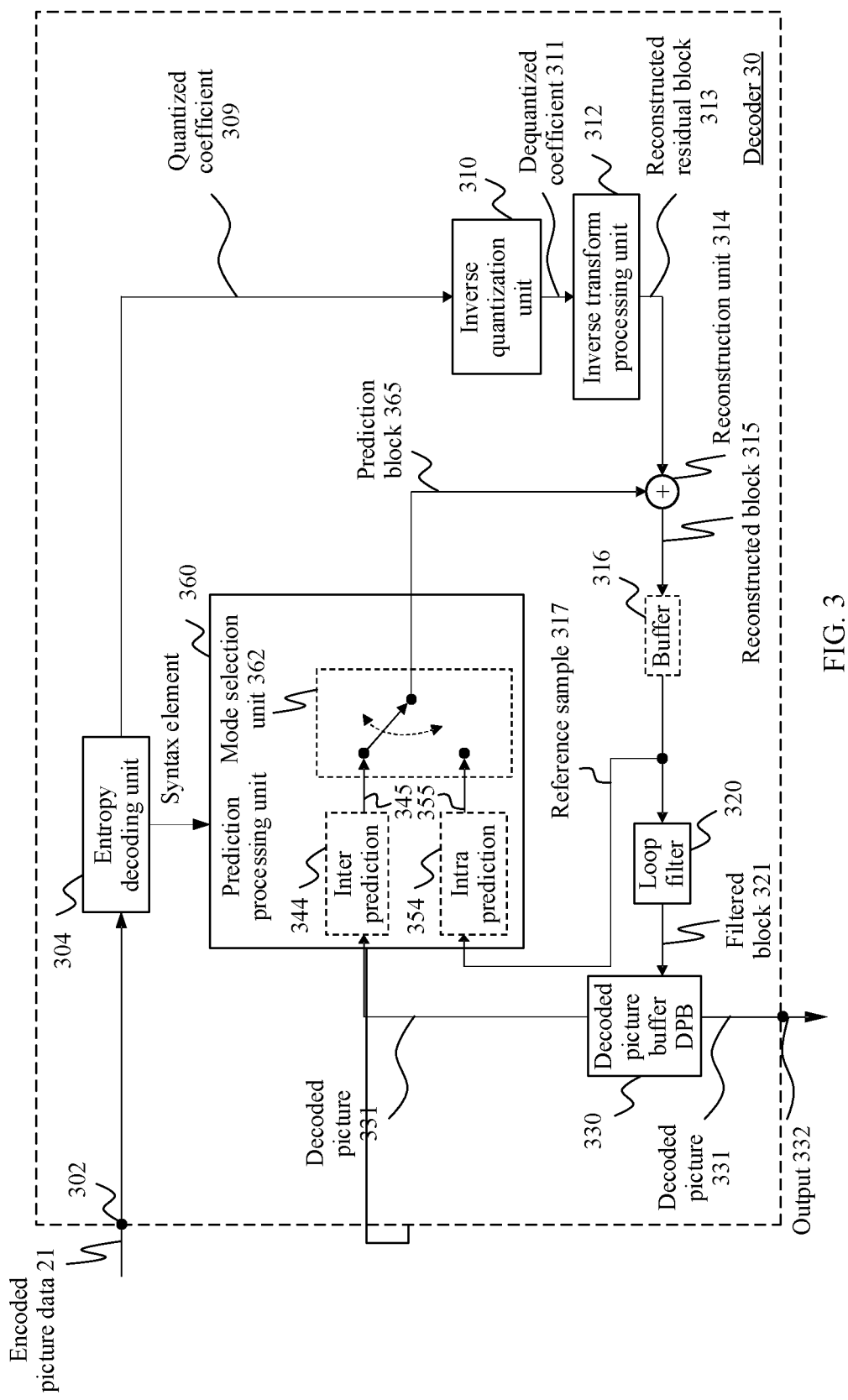
FIG. 3 is a block diagram of an example structure of a decoder according to an embodiment of this application.

Refer to FIG. 3. FIG. 3 is a schematic/conceptual block diagram of an example of a decoder 30 according to an embodiment of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a DPB 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The DPB 330 may have a same function as the DPB 230.

The prediction processing unit 360 may include the inter prediction unit 344 and the intra prediction unit 354. The inter prediction unit 344 may be similar to the inter prediction unit 244 in functions, and the intra prediction unit 354 may be similar to the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra-prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists, a list 0 and a list 1, by using a default construction technology and based on reference pictures stored in the DPB 230.

The prediction processing unit 360 is configured to determine prediction information for the video block of the current video slice by parsing the motion vector and another syntax element, and use the prediction information to generate a prediction block for the current video block that is being decoded. In an example of this application, the prediction processing unit 360 determines, by using some received syntax elements, a prediction mode (for example, intra or inter prediction) for encoding the video block in the video slice, an inter prediction slice type (for example, a B slice, a P slice, or a generalized P/B (GPB) slice), construction information of one or more of the reference picture lists for the slice, a motion vector for each inter encoded video block in the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), an SPS, a picture parameter set (PPS), or a slice header.

The inverse quantization unit 310 may be configured to perform inverse quantization (i.e., dequantization) on a quantized transform coefficient provided in the bitstream and decoded by the entropy decoding unit 304. An inverse quantization process may include using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, an SAO filter, or another filter, for example, a bilateral filter, an ALF, a sharpening or smoothing filter, or a collaborative filter. Although the loop filter unit 320 is shown as an in-loop filter in FIG. 3, in another implementation, the loop filter unit 320 may be implemented as a post-loop filter.

The decoded video block 321 in a given frame or picture is then stored in the DPB 330 that stores a reference picture used for subsequent motion compensation.

The decoder 30 is configured to, for example, output a decoded picture 31 through an output 332, for presentation to a user or viewing by a user.

Another variant of the video decoder 30 may be used to decode a compressed bitstream. For example, the decoder 30 may generate an output video bitstream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 combined into a single unit.

Further, in this embodiment of this application, the decoder 30 is configured to implement a video decoding method described in the following embodiments.

It should be understood that another structural variant of the video decoder 30 can be used to decode the encoded video bitstream. For example, the video decoder 30 may generate an output video bitstream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that, according to different application scenarios, the inter prediction unit and the intra prediction unit may be used selectively enabled.

It should be understood that, in the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of the corresponding procedure.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit width range. Assuming that an allowed bit width of the motion vector is bitDepth, the value of the motion vector ranges from −2^(bitDepth 1) to 2^(bitDepth 1)−1, where the symbol "A" represents exponentiation. If bitDepth is 16, the value ranges from 32768 to 32767. If bitDepth is 18, the value ranges from 131072 to 131071. For another example, the value of the motion vector (for example, motion vectors MVs of four 4×4 subblocks within one 8×8 picture block) is constrained so that a maximum difference between integer parts of the MVs of the four 4×4 subblocks does not exceed N pixels, for example, not exceed 1 pixel.

The following two manners may be used to restrict the motion vector to be within a specific bit width:

Manner 1: Remove an overflow most significant bit of the motion vector by the following operations:

$$ux=(vx+2^{bitDepth})\%2^{bitDepth},$$

$$vx=(ux>=2^{bitDepth-1})\%(ux-2^{bitDepth}):ux,$$

$$uy=(vy+2^{bitDepth})\%2^{bitDepth}, \text{ and}$$

$$vy=(uy>=2^{bitDepth-1})\%(uy-2^{bitDepth}):uy,$$

where vx is a horizontal component of the motion vector of the image block or the sub-block of the image block, vy is a vertical component of the motion vector of the image block or the sub-block of the image block, and ux and uy are intermediate values, and bitDepth represents a bit depth.

For example, a value of vx is 32769, and 32767 is derived according to the foregoing formulas. A value is stored on a computer in a two's complement representation, a two's complement representation of 32769 is 1,0111,1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clip the motion vector according to the following formulas:

$$vx=\text{Clip3}(-2^{bitDepth-1},2^{bitDepth-1},vx), \text{ and}$$

$$vy=\text{Clip3}(-2^{bitDepth-1},2^{bitDepth-1}-1,vy),$$

where vx is a horizontal component of the motion vector of the image block or the sub-block of the image block, and vy is a vertical component of the motion vector of the image block or the sub-block of the image block, and x, y, and z are respectively corresponding to three input values of an MV clamping process Clip3, and Clip3 is defined to indicate clipping a value of z on a range [x, y]:

$$\text{Clip3}(x, y, z) = \begin{cases} x; & z < x \\ y; & z > y \\ z; & \text{otherwise} \end{cases}.$$

Figure 4:
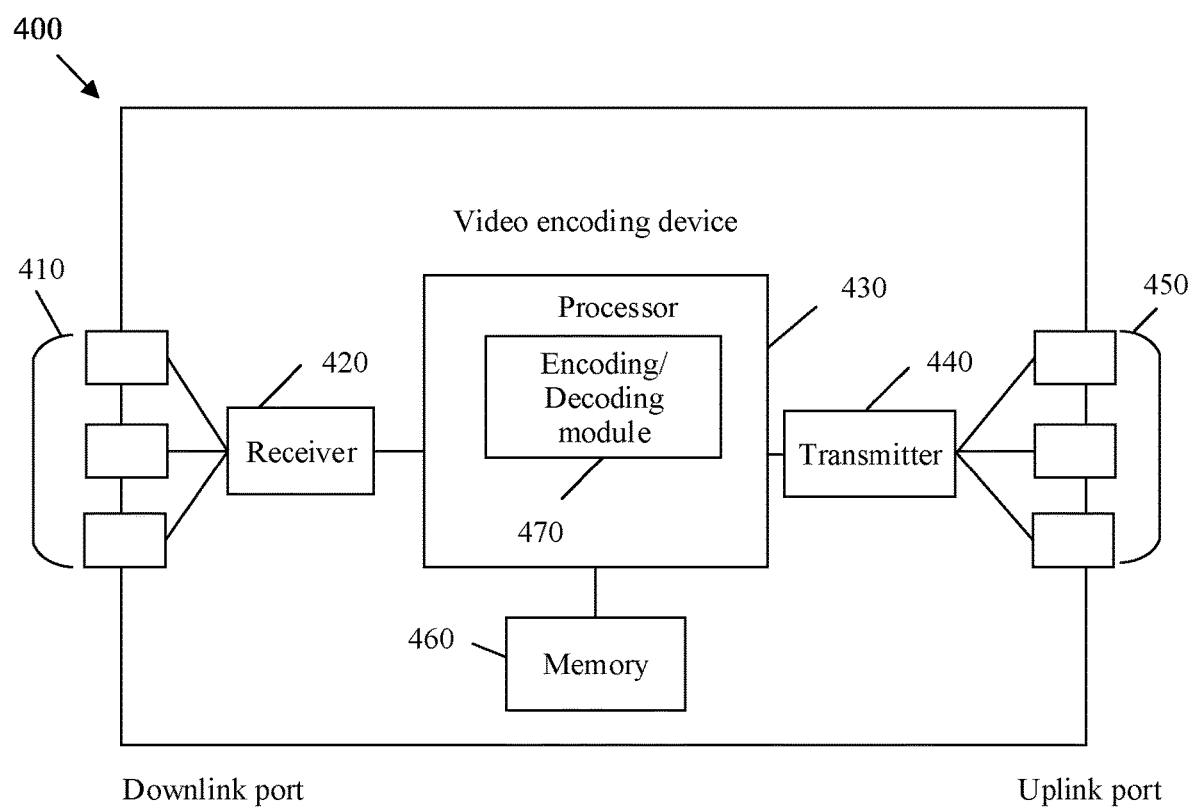
FIG. 4 is a block diagram of an example of a video coding device according to an embodiment of this application.

Refer to FIG. 4. FIG. 4 is a schematic diagram of a structure of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes an ingress port 410 and a receiver unit (Rx) 420 for receiving data, a processor, a logic unit, or a central processing unit (CPU) 430 for processing data, a transmitter unit (Tx) 440 and an egress port 450 for transmitting data, and a memory 460 for storing data. The video coding device 400 may further include an optical-to-electrical (OE) conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the chroma block prediction method provided in the embodiments of this application. For example, the encoding/decoding module 470 implements, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (TCAM), and/or an SRAM.

Figure 5:
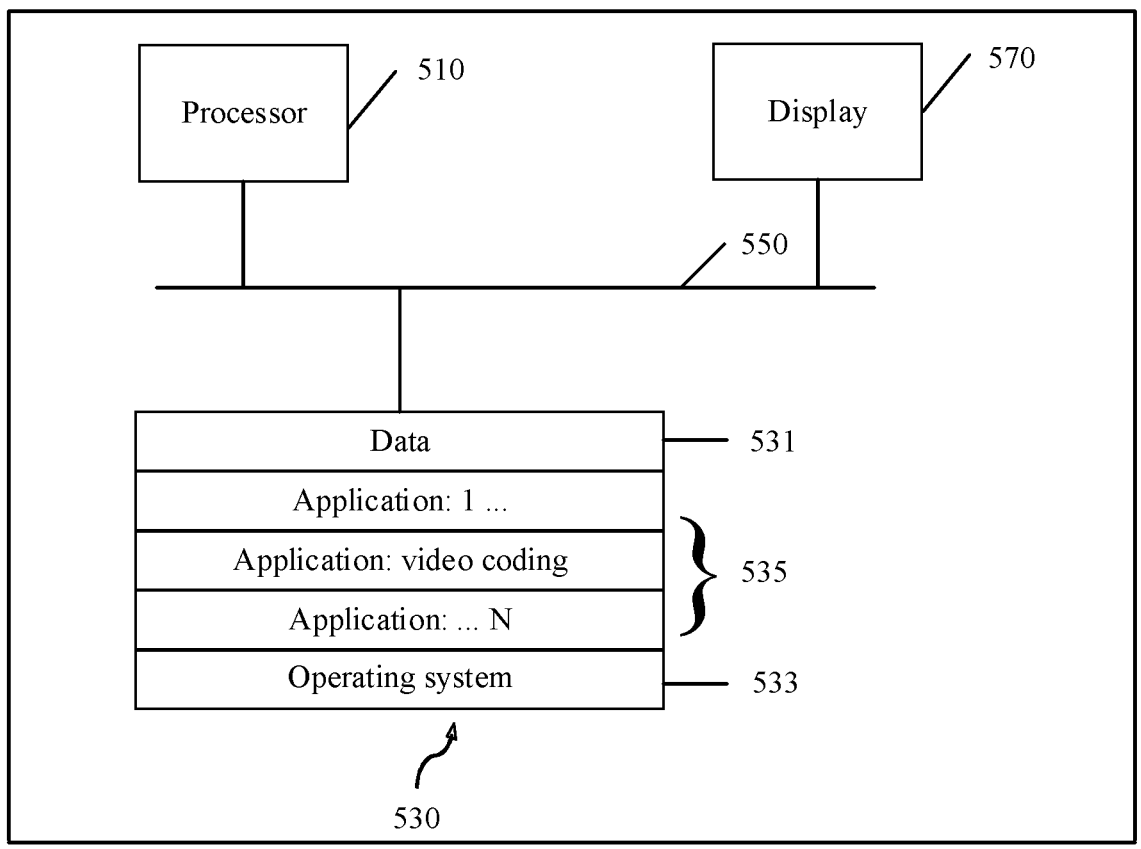
FIG. 5 is a block diagram of another example of an encoding apparatus or a decoding apparatus according to an embodiment of this application.

Refer to FIG. 5. FIG. 5 is a simplified block diagram of an apparatus 500 that may be used as either or two of the source device 12 and the destination device 14 in FIG. 1A according to an example embodiment. The apparatus 500 can implement the technologies of this application. In other words, FIG. 5 is a schematic block diagram of an implementation of an encoding device or a decoding device (or a coding device 500) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory, to perform various video encoding or decoding methods described in this application, particularly various new video decoding methods. To avoid repetition, details are not described herein again.

In this embodiment of this application, the processor 510 may be a CPU, or the processor 510 may be another general-purpose processor, a DSP, an ASIC, an FPGA or another programmable logic device, a discrete gate or transistor logic device, a discrete hardware assembly, or the like. The general-purpose processor may be a microprocessor, or the processor may be any conventional processor, or the like.

The memory 530 may include a ROM device or a RAM device. Any other suitable type of storage device may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method (in particular, the inter prediction method described in this application) described in this application. For example, the application programs 535 may include applications 1 to N, and further includes a video encoding or decoding application (briefly referred to as a video coding application) that is used to perform the video encoding or decoding method described in this application.

The bus system 550 may not only include a data bus, but also include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following describes in detail the technical solutions provided in the embodiments of this application.

Figure 6:
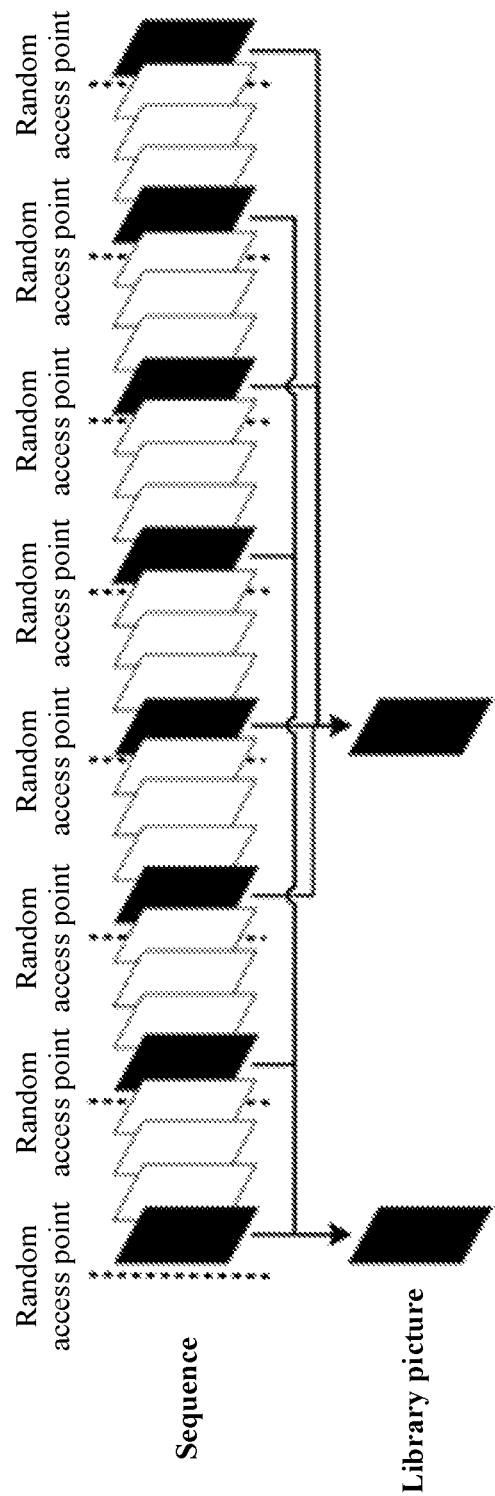
FIG. 6 is a schematic diagram of a relationship between a video bitstream and a library picture bitstream according to an embodiment of this application.

With development of video coding technologies, there are more video coding methods, including a library-based coding method. A video consists of picture sequences, and a picture sequence includes one or more frames of pictures. When encoding a to-be-encoded picture (or decoding a to-be-decoded picture), an encoder (or a decoder) may complete encoding (or decoding) based on a picture whose texture or content is similar to that of the to-be-encoded picture (or the to-be-decoded picture), to improve encoding (or decoding) efficiency. A referenced image is referred to as a library picture, and a database storing the picture is referred to as a library. Therefore, such a method for encoding and decoding at least one frame of picture in a video by referring to at least one frame of library picture is referred to as a library-based video coding method. When a video sequence is encoded by using a library-based video encoding method, a library picture bitstream and a video bitstream including frames of pictures in the video sequence are generated. A reference relationship between two layers of bitstreams is shown in FIG. 6. It can be seen that, the video bitstream depends on the library picture bitstream in a non-aligned time period.

After the video bitstream is obtained, a first decoder may be invoked to decode the library picture bitstream, to obtain a decoded library picture. Then, a second decoder is invoked to decode the video bitstream by referencing the decoded library picture. The same decoder may alternatively be invoked to decode the video bitstream and the library picture bitstream.

Figure 7:
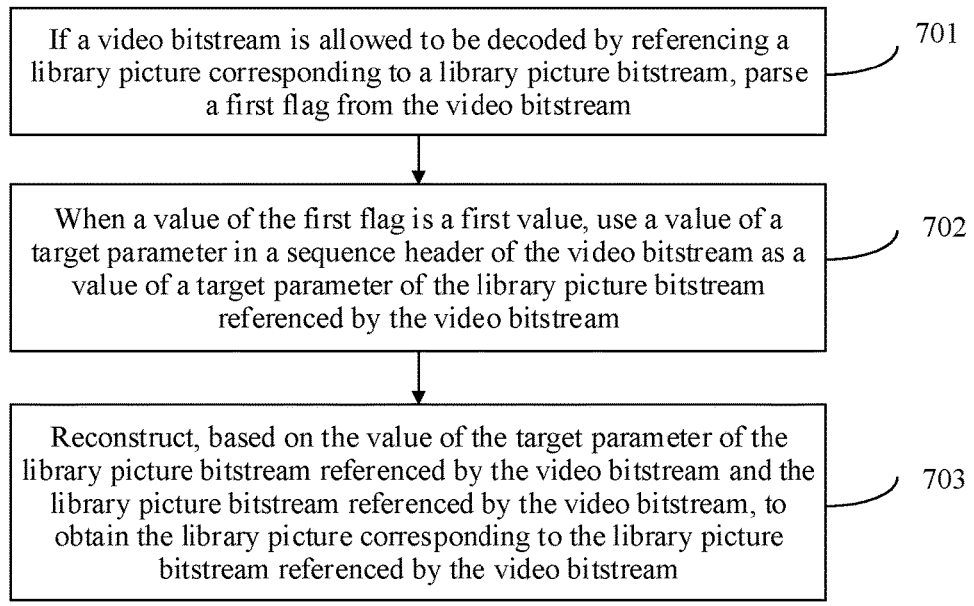
FIG. 7 is a flowchart of a video decoding method according to an embodiment of this application.

An embodiment of this application provides a video decoding method. This method may be applied to implementation environments shown in FIG. 1A, FIG. 1B, FIG. 3, FIG. 4, and FIG. 5. As shown in FIG. 7, this method includes the following steps.

Step 701: If a video bitstream is allowed to be decoded by referencing a library picture corresponding to a library picture bitstream, parse a first flag from the video bitstream.

In the decoding method provided in this embodiment of this application, a to-be-decoded bitstream is obtained in a decoding scenario, and the to-be-decoded bitstream is a bit string. The to-be-decoded bitstream is obtained through encoding by using a library-based encoding method. The to-be-decoded bitstream is one of a library picture bitstream or a video bitstream that references the library picture bitstream. Because the library picture bitstream and the video bitstream that references the library picture bitstream are decoded in different manners, after the to-be-decoded bitstream is obtained, if the video bitstream is allowed to be decoded by referencing the library picture corresponding to the library picture bitstream, before the first flag is parsed from the video bitstream, a type of the to-be-decoded bitstream needs to be determined, to decode the to-be-decoded bitstream in the corresponding decoding manner.

In an example embodiment, if the video bitstream is allowed to be decoded by referencing the library picture corresponding to the library picture bitstream, parsing a first flag from the video bitstream includes parsing a library picture reference flag from the video bitstream, where the library picture reference flag is used to indicate whether the video bitstream is allowed to be decoded by referencing the library picture corresponding to the library picture bitstream, and if a value of the library picture reference flag indicates that the video bitstream is allowed to be decoded by referencing the library picture corresponding to the library picture bitstream, parsing the first flag from the video bitstream.

It should be noted that "referencing" may be understood as "allowing to reference". "A video bitstream is allowed to be decoded by referencing a library picture corresponding to a library picture bitstream" may be understood as "a video bitstream needs to be decoded by referencing a library picture corresponding to a library picture bitstream".

The library picture reference flag may indicate, through a numerical value, whether the video bitstream is allowed (or required) to be decoded by referencing the library picture corresponding to the library picture bitstream. For example, the value of the library picture reference flag being a first value indicates that the video bitstream is allowed to be decoded by referencing the library picture corresponding to the library picture bitstream. The value of the library picture reference flag being a second value indicates that the video bitstream is not allowed to be decoded by referencing the library picture corresponding to the library picture bitstream, or indicates that the video bitstream is not necessarily allowed or not required to be decoded by referencing the library picture corresponding to the library picture bitstream. The first value and the second value of the library picture reference flag are different.

For example, the first value of the library picture reference flag may be 1, and it indicates that the video bitstream is allowed to be decoded by referencing the library picture corresponding to the library picture bitstream. The second value of the library picture reference flag may be 0, and it indicates that the video bitstream is not allowed to be decoded by referencing the library picture corresponding to the library picture bitstream. Therefore, when the library picture reference flag that is parsed from the video bitstream is 1, it may be determined that the video bitstream is allowed to be decoded by referencing the library picture corresponding to the library picture bitstream.

Certainly, values of the first value and the second value that are used by the library picture reference flag are not limited in this embodiment. For example, the first value may be 0, and the second value may be 1. Therefore, when the value of the library picture reference flag is 0, it indicates that the video bitstream is allowed to be decoded by referencing the library picture corresponding to the library picture bitstream. When the value of the library picture reference flag is 1, it indicates that the video bitstream is not allowed to be decoded by referencing the library picture corresponding to the library picture bitstream.

In an example embodiment, the library picture reference flag may also be used to indicate whether the video bitstream needs to be decoded by referencing the library picture corresponding to the library picture bitstream. If the value of the library picture reference flag indicates that the video bitstream needs to be decoded by referencing the library picture corresponding to the library picture bitstream, the first flag is parsed from the video bitstream.

The library picture reference flag may indicate, through a numerical value, whether the video bitstream needs to be decoded by referencing the library picture corresponding to the library picture bitstream. For example, the value of the library picture reference flag being the first value indicates that the video bitstream needs to be decoded by referencing the library picture corresponding to the library picture bitstream. The value of the library picture reference flag being the second value indicates that the video bitstream does not need to be decoded by referencing the library picture corresponding to the library picture bitstream, or indicates that the video bitstream does not necessarily need to or is not required to be decoded by referencing the library picture corresponding to the library picture bitstream. For example, if the first value of the library picture reference flag is 1, it indicates that the video bitstream needs to be decoded by referencing the library picture corresponding to the library picture bitstream. If the second value of the library picture reference flag is 0, it indicates that the video bitstream does not need to be decoded by referencing the library picture corresponding to the library picture bitstream. Therefore, when the library picture reference flag that is parsed from the video bitstream is 1, it may be determined the video bitstream needs to be decoded by referencing the library picture corresponding to the library picture bitstream.

Certainly, values of the first value and the second value that are used by the library picture reference flag are not limited in this embodiment. For example, the first value of the library picture reference flag may be 0, and the second value of the library picture reference flag may be 1. Therefore, when the value of the library picture reference flag is 0, it may indicate that the video bitstream needs to be decoded by referencing the library picture corresponding to the library picture bitstream. When the value of the library picture reference flag is 1, it may indicate that the video bitstream does not need to be decoded by referencing the library picture corresponding to the library picture bitstream.

Optionally, the first flag may include a same parameter flag. The same parameter flag is used to indicate whether a value of a target parameter of the library picture bitstream referenced by the video bitstream is the same as a value of a target parameter in a sequence header of the video bitstream. The target parameter in the sequence header of the video bitstream may include decoding capability information of the video bitstream. A value of the same parameter flag being a first value indicates that the value of the target parameter of the library picture bitstream is the same as the value of the target parameter in the sequence header of the video bitstream. The value of the same parameter flag being the first value indicates that the value of the target parameter of the library picture bitstream may be different from the value of the target parameter in the sequence header of the video bitstream, or indicates that the value of the target parameter of the library picture bitstream is not necessarily the same as or is not required to be the same as the value of the target parameter in the sequence header of the video bitstream, or indicates that the value of the target parameter of the library picture bitstream is different from the value of the target parameter in the sequence header of the video bitstream. Optionally, in this implementation, in addition to determining that the video bitstream needs to be allowed to be decoded by referencing the library picture corresponding to the library picture bitstream, it may be further determined whether the video bitstream and the library picture bitstream allowed to be referenced by the video bitstream use a same standard. If they use the same standard, the target parameter (which may include the decoding capability information) of the video bitstream is used as the target parameter (which may include decoding capability information) of the library picture bitstream. The standard refers to a video coding standard, for example, may be an AVS, HEVC, and H.264. The same standard flag may also indicate, through a numerical value, whether the video bitstream and the library picture bitstream allowed to be referenced by the video bitstream use the same standard. For example, when the same standard flag is a first value, it indicates that the video bitstream and the library picture bitstream allowed to be referenced by the video bitstream use the same standard. When the same standard flag is a second value, it indicates that the video bitstream and the library picture bitstream allowed to be referenced by the video bitstream use different standards, or indicates that the video bitstream and the library picture bitstream allowed to be referenced by the video bitstream do not necessarily use or are not required to use the same standard. For example, when the first value of the same standard flag is 1, it indicates that the video bitstream and the library picture bitstream allowed to be referenced by the video bitstream use the same standard. When the second value of the same standard flag is 0, it indicates that the video bitstream and the library picture bitstream allowed to be referenced by the video bitstream use different standards.

Certainly, values of the first value and the second value that are used by the same standard flag are not limited in this embodiment. For example, the first value of the same standard flag may be 0, and the second value of the same standard flag may be 1. Therefore, when the value of the same standard flag is 0, it may indicate that the video bitstream and the library picture bitstream allowed to be referenced by the video bitstream use the same standard. When the value of the same standard flag is 1, it may indicate that the video bitstream and the library picture bitstream allowed to be referenced by the video bitstream use different standards.

It should be noted that, if the video bitstream and the library picture bitstream allowed to be referenced by the video bitstream use different standards, the library picture bitstream cannot be decoded even if the value of the target parameter (which may include the decoding capability information) of the library picture bitstream is obtained by parsing the video bitstream. As a result, a waste of resources is caused because resources of a decoder of the video bitstream are occupied, and decoding efficiency is reduced.

Based on the foregoing description, in this embodiment, content indicated by the same parameter flag may also be expanded to include the following information. The same parameter flag may be further used to indicate whether the video bitstream and the library picture bitstream use the same standard. For example, the same parameter flag is indicated through a numerical value. After expansion, when the value of the same parameter flag is the first value (for example, may be 1), it further indicates that the video bitstream and the library picture bitstream use the same standard. When the value of the same parameter flag is the second value (for example, may be 0), it further indicates that the video bitstream and the library picture bitstream use different standards.

If the video bitstream and the library picture bitstream use different standards, the solution provided in this embodiment is that the decoder of the video bitstream outputs information about the standard used for the library picture bitstream, to invoke the decoder capable of decoding the bitstream that uses the standard to decode the library picture bitstream.

Optionally, the first flag may also include the same standard flag. The same standard flag is used to indicate whether the video bitstream and the library picture bitstream referenced by the video bitstream use the same standard. The value of the same standard flag being the first value indicates that the video bitstream and the library picture bitstream referenced by the video bitstream use the same standard. The same standard flag being the second value indicates that the video bitstream and the library picture bitstream referenced by the video bitstream use different standards, or indicates that the video bitstream and the library picture bitstream referenced by the video bitstream do not necessarily use or are not required to use the same standard.

In an optional implementation, after the to-be-decoded video bitstream is obtained, or before the library picture reference flag is parsed from the video bitstream, the method may further include parsing a library picture flag from the video bitstream, where a value of the library picture flag being a second value (which may be 0 or 1) indicates that the video bitstream is not the library picture bitstream. The library picture reference flag is parsed from the video bitstream only when the value of the library picture flag indicates that the video bitstream is not the library picture bitstream. The library picture flag being a first value (which may be 0 or 1, and the first value is different from the second value) indicates that a bitstream in which the library picture flag is located is the library picture bitstream.

It can be learned that, in this implementation, before it is determined whether the video bitstream is allowed (or required) to be decoded by referencing the library picture corresponding to the library picture bitstream, it is first determined whether the obtained bitstream is the library picture bitstream or the video bitstream (which may be determined by parsing the value of the library picture flag in the bitstream). After it is determined that the obtained bitstream is the video bitstream instead of the library picture bitstream, it is further determined whether the video bitstream is allowed (or required) to be decoded by referencing the library picture corresponding to the library picture bitstream (which may be determined by parsing the value of the library picture reference flag in the video bitstream). For example, if the bitstream is the video bitstream instead of the library picture bitstream, the library picture reference flag is parsed from the video bitstream. If the library picture reference flag indicates that the video bitstream is allowed to be decoded by referencing the library picture corresponding to the library picture bitstream, the first flag is parsed from the video bitstream. It is determined, by using a value of the first flag, whether the value of the target parameter of the library picture bitstream referenced by the video bitstream is the same as the value of the target parameter in the sequence header of the video bitstream. According to the foregoing process, the obtained bitstream may be determined as one of the following three types:

First type: If the library picture flag indicates that the bitstream is the library picture bitstream, it may be determined that the bitstream is the library picture bitstream.

Second type: If the library picture flag indicates that the bitstream is the video bitstream instead of the library picture bitstream, and the library picture reference flag indicates that the video bitstream is not allowed to be decoded by referencing the library picture corresponding to the library picture bitstream, it may be determined that the video bitstream is a bitstream obtained by encoding a picture sequence in a video, and the bitstream is not allowed to be decoded by referencing the library picture corresponding to the library picture bitstream.

Third type: If the library picture flag indicates that the bitstream is the video bitstream instead of the library picture bitstream, and the library picture reference flag indicates that the video bitstream is allowed to be decoded by referencing the library picture corresponding to the library picture bitstream, it may be determined that the video bitstream is a bitstream obtained by encoding a picture sequence in a video, and the video bitstream is allowed to be decoded by referencing the library picture corresponding to the library picture bitstream.

It can be learned that, if it is not determined whether the obtained bitstream is the library picture bitstream, it can only be determined that the bitstream is a bitstream that is not allowed to reference the library picture bitstream and a bitstream that references the library picture bitstream. The bitstream that is not allowed to reference the library picture bitstream actually includes the first type and the second type of bitstreams. Therefore, determining whether the video bitstream is the library picture bitstream helps distinguish the obtained video bitstream more accurately. In other words, the first type and the second type are further distinguished.

It should be noted that the library picture flag may also indicate, through a numerical value, whether the video bitstream is the library picture bitstream. Details have been provided above, and are not described herein again.

Step 702: When the value of the first flag is a first value, use the value of the target parameter in the sequence header of the video bitstream as the value of the target parameter of the library picture bitstream referenced by the video bitstream.

After it is determined that the video bitstream is allowed to be decoded by referencing the library picture corresponding to the library picture bitstream, and the first flag of the video bitstream is the first value, the value of the target parameter (which may include the decoding capability information) of the video bitstream is used as the target parameter (which may include the decoding capability information) of the library picture bitstream referenced by the video bitstream. The target parameter includes the decoding capability information. The decoding capability information is used to indicate a decoding capability required for decoding a bitstream. A decoder whose decoding capability is not lower than the decoding capability indicated by the decoding capability information is invoked based on the decoding capability information, to decode the bitstream. Therefore, the decoding capability information of the library picture bitstream is obtained from the video bitstream, to determine whether a decoding capability of the decoder of the video bitstream satisfies the decoding capability information of the library picture bitstream. The library picture bitstream is decoded based on a determining result. Optionally, the decoding capability information includes but is not limited to information such as a maximum bit rate of the bitstream and a minimum size of a DPB required to decode the bitstream.

Further, the decoding capability information of the library picture bitstream may be obtained from the video bitstream in step 701 or step 702 in but is not limited to the following five manners in this embodiment.

In a first obtaining manner, the decoding capability information of the library picture bitstream is parsed from a VPS of the video bitstream.

Figure 8A:
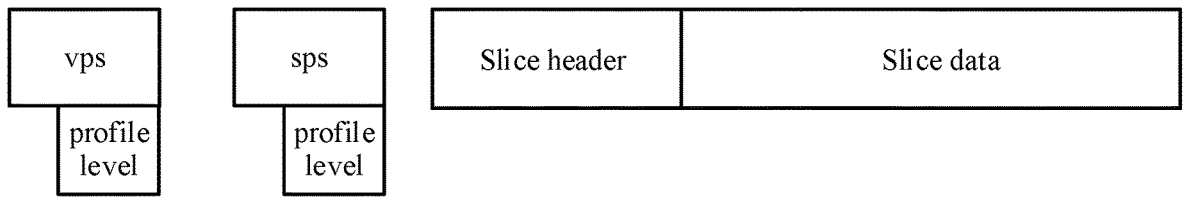
FIG. 8A is a schematic diagram of a location of decoding capability information in a bitstream according to an embodiment of this application.

The parsing manner may be applied to a video bitstream using the HEVC or the Versatile Video Coding (VVC) standard. Refer to FIG. 8A. The video bitstream encoded by using HEVC or VVC includes a VPS, an SPS, and slice-related data obtained by encoding a picture sequence that constitutes a video. The slice-related data includes a slice header and slice data. The decoding capability information of the library picture bitstream is located in the VPS of the video bitstream. For a syntax table of the VPS, refer to Table 1.

TABLE 1

| video_parameter_set_rbsp( ){ | Descriptor |
| --- | --- |
| (Syntax at the beginning is omitted) | |
| vps_library_picture_enable_flag | u(1) |
| if(vps_library_picture_enable_flag) { | |
|   vps_library_same_standard_flag | u(1) |
|   if(vps_library_same_standard_flag) | |
|   profile_tier_level(1, 0) | |
| } | |
| (The remaining syntax is omitted) | |
| } | |

The vps_library_picture_enable_flag is an example of the library picture reference flag. When the value is the first value (for example, may be 1), it indicates that the video bitstream is allowed or required to be decoded by referencing the library picture corresponding to the library picture bitstream. When the value is the second value (for example, may be 0), it indicates that the video bitstream is not allowed to be decoded by referencing the library picture corresponding to the library picture bitstream, or indicates that the video bitstream is not necessarily allowed or not required to be decoded by referencing the library picture corresponding to the library picture bitstream.

The vps_library_same_standard_flag is an example of the same standard flag. When the value is the first value (for example, may be 1), it indicates that the video bitstream and the library picture bitstream referenced by the video bitstream use the same standard. When the value is the second value (for example, may be 0), it indicates that the video bitstream and the library picture bitstream referenced by the video bitstream use different standards, or indicates that the video bitstream and the library picture bitstream referenced by the video bitstream do not necessarily use or are not required to use the same standard.

The profile tier level is an example of the decoding capability information of the library picture bitstream.

Correspondingly, the decoder performs parsing in the following manner:

(1) Parse vps_library_picture_enable_flag to determine whether the video bitstream is allowed (or required) to be decoded by referencing the library picture corresponding to the library picture bitstream.

(2) If the video bitstream is allowed (or required) to be decoded by referencing the library picture corresponding to the library picture bitstream, parse vps_library_same_standard_flag to determine whether the video bitstream and the library picture bitstream referenced or allowed to be referenced by the video bitstream use the same standard.

(3) If the video bitstream and the library picture bitstream allowed or required to be referenced by the video bitstream use the same standard, parse the decoding capability information that is of the library picture bitstream and that is included in profile tier level.

It can be learned that, in this embodiment, the decoding capability information of the library picture bitstream is described by using profile tier level in the VPS. In addition, profile_tier_level that includes the decoding capability information of the library picture bitstream may be independent of profile_tier_level of the decoding capability information of the video bitstream, or may be further expanded based on profile_tier_level of the decoding capability information of the video bitstream. In addition, the library picture flag may be further added to the syntax table to indicate whether the bitstream in which the library picture flag is located is the library picture bitstream.

In an optional step, when a decoding capability of a decoder of a current bitstream satisfies the requirement of the decoding capability information required by the library picture bitstream, the decoder of the current bitstream may be further used to decode the library picture bitstream.

When an external library bitstream (that is, the library picture bitstream) referenced by the current bitstream does not comply with this standard or the decoding capability of the decoder of the current bitstream does not satisfy the requirement of the decoding capability information required by the library picture bitstream, in an optional step, the decoder outputs information about a standard with which the library picture bitstream complies, so that a system can invoke a corresponding decoder to decode the library picture bitstream.

An encoder performs encoding as follows:

(1) Obtain a current to-be-encoded picture.

(2) Determine a value of a library picture reference flag (for example, may be vps_library_picture_enable_flag) based on whether the current to-be-encoded picture is allowed (or required) to be encoded by referencing a library picture corresponding to a library picture bitstream.

The encoding-side method may further include determining whether the current to-be-encoded picture is allowed (or required) to be encoded by referencing the library picture corresponding to the library picture bitstream. Further, this may be determined based on a rate-distortion cost or another indicator for measuring encoding efficiency or encoding performance.

(3) If the current to-be-encoded picture is allowed (or required) to be encoded by referencing the library picture corresponding to the library picture bitstream, encode the current to-be-encoded picture to obtain encoded data. Determine, based on whether the referenced library picture bitstream and the encoded data use a same standard, a value of a same standard flag (for example, may be vps_library_same_standard_flag).

(4) If the referenced library picture bitstream and the encoded data obtained after the encoding use the same standard, add decoding capability information (for example, may be profile_tier_level) of the library picture bitstream and a library picture reference flag (for example, may be vps_library_picture_enable_flag) to the encoded data, to obtain a video bitstream. For example, profile_tier_level is used to indicate the decoding capability information of the library picture bitstream, and profile_tier_level is located in a VPS of the encoded data.

It should be noted that the encoded data is data obtained by encoding a picture sequence that constitutes a video, and the encoded data includes the VPS, an SPS, and slice-related data. A manner of adding profile_tier_level to the encoded data may be as follows. Update a first profile_tier_level in the encoded data based on the decoding capability information of the library picture bitstream, to obtain an updated profile_tier_level, and overwrite the first profile_tier_level with the updated profile_tier_level, to add profile_tier_level. Alternatively, the adding manner may be as follows. Determine a second profile_tier_level based on the decoding capability information of the library picture bitstream, and add the second profile_tier_level to the encoded data. In other words, there are both the first profile_tier_level and the second profile_tier_level in the encoded data, to add profile_tier_level.

In a second obtaining manner, the decoding capability information of the library picture bitstream is parsed from an SPS of the video bitstream.

The parsing manner may also be applied to a video bitstream using the HEVC or VVC standard, but the decoding capability information of the library picture bitstream is located in the SPS of the video bitstream. In this case, a syntax table of the SPS is shown in Table 2:

TABLE 2

| seq_parameter_set_rbsp( ){ | Descriptor |
|---|---|
| (Syntax at the beginning is omitted) | |
| sps_library_picture_enabale_flag | u(1) |
| if(sps_library_picture_enable_flag) { | |
|    sps_library_same_standard_flag | u(1) |
|    if(sps_library_same_standard_flag) | |
|      profile_tier_level(1, 0) | |
| } | |
| (The remaining syntax is omitted) | |
| } | |

The sps_library_picture_enable_flag is an example of the library picture reference flag. When the value is the first value (for example, may be 1), it indicates that the video bitstream is allowed or required to be decoded by referencing the library picture corresponding to the library picture bitstream. When the value is the second value (for example, may be 0), it indicates that the video bitstream is not allowed or not required to be decoded by referencing the library picture corresponding to the library picture bitstream, or indicates that the video bitstream is not necessarily allowed or not required to be decoded by referencing the library picture corresponding to the library picture bitstream.

The sps_library_same_standard_flag is an example of the same standard flag. When the value is the first value (for example, may be 1), it indicates that the video bitstream and the library picture bitstream referenced by the video bitstream use the same standard. When the value is the second value (for example, may be 0), it indicates that the video bitstream and the library picture bitstream referenced by the video bitstream use different standards, or indicates that the video bitstream and the library picture bitstream referenced by the video bitstream do not necessarily use or are not required to use the same standard.

The profile_tier_level is an example of the decoding capability information of the library picture bitstream.

Correspondingly, the decoder performs parsing in the following manner:

(1) Parse sps_library_picture_enable_flag to determine whether the bitstream is allowed (or required) to be decoded by referencing the library picture corresponding to the library picture bitstream.

(2) If the video bitstream is allowed (or required) to be decoded by referencing the library picture corresponding to the library picture bitstream, parse sps_library_same_standard_flag to determine whether the video bitstream and the library picture bitstream referenced or allowed to be referenced by the video bitstream use the same standard.

(3) If the video bitstream and the library picture bitstream allowed or required to be referenced by the video bitstream use the same standard, parse the decoding capability information that is of the library picture bitstream and that is included in profile_tier_level.

It can be learned that, in this embodiment, the decoding capability information of the library picture bitstream is described by using profile_tier_level in the SPS. In addition, profile_tier_level that includes the decoding capability information of the library picture bitstream may be independent of profile_tier_level of the decoding capability information of the video bitstream, or may be further expanded based on profile_tier_level of the decoding capability information of the video bitstream. In addition, the library picture flag may be further added to the syntax table to indicate whether the bitstream in which the library picture flag is located is the library picture bitstream.

In an optional step, when a decoding capability of a decoder of a current bitstream satisfies the requirement of the decoding capability information required by the library picture bitstream, the decoder of the current bitstream may be further used to decode the library picture bitstream.

When an external library bitstream (that is, the library picture bitstream) referenced by the current bitstream does not comply with this standard or the decoding capability of the decoder of the current bitstream does not satisfy the requirement of the decoding capability information required by the library picture bitstream, in an optional step, the decoder outputs information about the standard with which the library picture bitstream complies, so that a system can invoke a corresponding decoder to decode the library picture bitstream.

An encoder performs encoding as follows:

(1) Obtain a current to-be-encoded picture.

(2) Determine a value of a library picture reference flag (for example, may be sps_library_picture_enable_flag) based on whether the current to-be-encoded picture is allowed (or required) to be encoded by referencing a library picture corresponding to a library picture bitstream.

The encoding-side method may further include determining whether the current to-be-encoded picture is allowed (or required) to be encoded by referencing the library picture corresponding to the library picture bitstream. Further, this may be determined based on a rate-distortion cost or another indicator for measuring encoding efficiency or encoding performance.

(3) If the current to-be-encoded picture is allowed (or required) to be encoded by referencing the library picture corresponding to the library picture bitstream, encode the current to-be-encoded picture to obtain encoded data. Determine, based on whether the referenced library picture bitstream and the encoded data use a same standard, a value of a same standard flag (for example, may be sps_library_same_standard_flag).

(4) If the referenced library picture bitstream and the encoded data obtained after the encoding use the same standard, add decoding capability information (for example, may be profile_tier_level) of the library picture bitstream and a library picture reference flag (for example, may be sps_library_picture_enable_flag) to the encoded data, to obtain a video bitstream. For example, profile_tier_level is used to indicate the decoding capability information of the library picture bitstream, and profile_tier_level is located in an SPS of the encoded data.

An adding manner has been described in the first obtaining manner. Therefore, details are not described herein again.

In an example of profile_tier_level in the first parsing manner or the second parsing manner, profile_tier_level may be used to expand a structure of the decoding capability information of the video bitstream, so that profile_tier_level can not only describe the decoding capability information of the library picture bitstream, but also describe the decoding capability information of the library picture bitstream allowed or required to be referenced by the video bitstream for decoding. A syntax table of profile_tier_level is shown in Table 3:

TABLE 3

| profile_tier_level(profilePresentFlag,maxNumSubLayersMinus1) { | Descriptor |
| --- | --- |
| if(profilePresentFlag) { | |
| general_profile_space | u(2) |
| (The middle part is omitted) | |
| general_reserved_zero_bit | u(1) |
| } | |
| general_level_idc | u(8) |
| (The middle part is omitted) | |
| for(i=0; i<maxNumSubLayersMinus1;i++){ | |
| (The middle part is omitted) | |
| if(sub_layer_level_present flag[i]) | |

TABLE 3-continued

| profile_tier_level(profilePresentFlag,maxNumSubLayersMinus1) { | Descriptor |
|---|---|
| sub_layer_level_idc[i] | u(8) |
| } | |
| if(library_picture enable_flag){ | |
| library_same_standard_flag | u(1) |
| if(library_same_standard_flag) | |
| library_level_present_flag | u(1) |
| if(library_level_present_flag){ | |
| library_profile_space | u(2) |
| library_tier_flag | u(1) |
| library_profile_idc | u(5) |
| for( j = 0; j<32; j++ ) | |
| library_profile_compatibility_flag[ j ] | u(1) |
| library_progressive_source_flag | u(1) |
| library_interlaced_source_flag | u(1) |
| library_non_packed_constraint_flag | u(1) |
| library_frame_only_constraint_flag | u(1) |
| if(library_profile_idc= = 4 \| \| library_profile_compatibility_flag[ 4 ] | |
| \| \| library_profile_idc = = 5 \| \| library_profile_compatibility_flag[ 5 ] | |
| \| \| library_profile_idc = = 6 \| \| library_profile_compatibility_flag[ 6 ] | |
| \|\|library_profile_idc = = 7 \| \| library_profile_compatibility_flag[ 7 ] ) | |
| library_max_12bit_constraint_flag | u(1) |
| library_max_10bit_constraint_flag | u(1) |
| library_max_8bit_constraint_flag | u(1) |
| library_max_422chroma_constraint_flag | u(1) |
| library_max_420chroma_constraint_flag | u(1) |
| library_max_monochrome_constraint_flag | u(1) |
| library_intra_constraint_flag | u(1) |
| library_one_picture_only_constraint_flag | u(1) |
| library_lower_bit_rate_constraint_flag | u(1) |
| } else | |
| library_reserved_zero_43bits | u(43) |
| if( ( library_profile_idc>= 1&&library_profile_idc<= 5 ) \| \| | |
| library_profile_compatibility_flag[ 1 ]\| \| | |
| library_profile_compatibility_flag[ 2 ] \| \| | |
| library_profile_compatibility_flag[ 3 ] \| \| | |
| library_profile_compatibility_flag[ 4 ] \| \| | |
| library_profile_compatibility_flag[ 5 ] ) | |
| library_inbld_flag | u(1) |
| else | |
| library_reserved_zero_bit | u(1) |
| } | |
| if( library_level_present_flag) | |
| library_level_idc | u(8) |
| } | |
| } | |

Meanings of statements in Table 3 are as follows:

The library_picture_enable_flag is an example of the library picture reference flag, and is used to indicate whether the video bitstream is allowed (or required) to be decoded by referencing the library picture corresponding to the library picture bitstream. It can be learned that a function of library_picture_enable_flag is the same as that of vps_library_picture_enable_flag in the first parsing manner and that of sps_library_picture_enabale flag in the second parsing manner. When the value is the second value (for example, may be 0), it indicates that a current bitstream is not allowed to be decoded by referencing the library picture corresponding to the library picture bitstream, or indicates that the current bitstream is not necessarily allowed or not required to be decoded by referencing the library picture corresponding to the library picture bitstream.

The library_same_standard_flag is an example of the first flag, that is, an example of the same standard flag, and is used to indicate whether the video bitstream and the library picture bitstream referenced by the video bitstream use the same standard, and whether the video bitstream carries the decoding capability information of the library picture bitstream.

The library_level_present flag is used to indicate whether profile_tier_level includes a level of the library picture bitstream. The level is used to indicate related parameters of the library picture bitstream, for example, a sampling rate and resolution. When a value is a first value (for example, may be 1), it indicates that profile_tier_level includes the level of the library picture bitstream. When the value is a second value (for example, may be 0), it indicates that profile_tier_level does not include the level of the library picture bitstream, or indicates that profile_tier_level does not necessarily include or is not required to include the level of the library picture bitstream.

The library_profile_space is used to indicate definitions of library_profile_idc and library_profile_compatibility_flag[j]. It should be noted that, when the video bitstream and the library picture bitstream use the same standard, a value of library_profile_space should be 0.

The library tier flag indicates a definition of library_profile_idc.

The library_profile_idc is used to indicate a profile of the video bitstream when the value of library_profile_space is 0. In other words, the profile is a class to which the library picture bitstream belongs. The profile indicates information such as an algorithm used by the video bitstream. The profile indicated by library_profile_idc varies with a value of library_profile_idc.

The library_profile_compatibility_flag[j] indicates if the value of library_profile_space is 0, a value of library_profile_compatibility_flag[j] should be 1 and indicates that the video bitstream satisfies the profile indicated by library_profile_idc.

The library_progressive_source_flag and library interlaced source flag are used to indicate a scan type of a picture source in the video bitstream. When library_progressive_source_flag is 1 and library_interlaced_source_flag is 0, the scan type of the picture source is progressive scanning (progressive). When library_progressive_source_flag is 0 and library_interlaced_source_flag is 1, it indicates that the scan type of the picture source is interlaced scanning (interlaced). When library_progressive_source_flag and library_interlaced_source_flag are both 0, it indicates that the scan type of the picture source is unknown. When library_progressive_source_flag and library_interlaced_source_flag are both 1, it indicates that the scan type of the picture source is defined by another statement. For example, source scan type may be used to define the scan type of the picture source.

The library_non_packed_constraint_flag is used to indicate whether additional enhancement information is set for frame-level packaging and a frame-level partitioning rectangle in the video bitstream. When a value is 1, it indicates that no additional enhancement information is set for frame-level packaging and a frame-level partitioning rectangle in the video bitstream. When the value is 0, it indicates that additional enhancement information is set for frame-level packaging or a frame-level partitioning rectangle in the video bitstream.

The library frame only constraint flag is used to indicate whether the video bitstream includes a field picture. When a value is 1, it indicates that the video bitstream does not include the field picture. When the value is 0, it indicates that the video bitstream may include the field picture.

Further, when profilePresentFlag is 1, a value range of library_profile_idc is not 4 to 7. If a value range of j is 4 to 7, library_profile_compatibility_flag[j] is not 1, to indicate that the profile of the video bitstream does not satisfy the profile indicated by library_profile_idc. In this case, values of library_max_12bit_constraint_flag, library_max_10bit_constraint_flag, library_max_8bit_constraint_flag, library_max 422chroma_constraint_flag, library_max_420chroma_constraint_flag, library_max_monochrome_constraint_flag, library_intra_constraint_flag, library_one_picture_only_constraint, and library_lower_bit_rate_constraint_flag are all 0.

A value of library_reserved_zero 43bits is 0 if the video bitstream and the library picture bitstream use the same standard.

library_inbld_flag is used to indicate whether an independent non-lower-layer decoding capability needs to decode a layer to which profile_tier_level is applied. When a value of profilePresentFlag is 1, the value range of library_profile_idc is not 1 to 5. If the value range of j is 1 to 5, library_profile_compatibility_flag[j] is not 1, to indicate that the profile of the video bitstream does not satisfy the profile indicated by library_profile_idc. A value of library_inbld_flag is 0. In this case, library_inbld_flag indicates that the independent non-lower-layer decoding capability does not need to decode the layer to which profile_tier_level is applied. The independent non-low-layer decoding capability refers to a capability of performing independent decoding on a non-low-layer bitstream.

The library_reserved_zero bit indicates if the video bitstream and the library picture bitstream use the same standard, the value of library_reserved_zero_43bits is 0.

The library_level_idc is used to indicate a level of the video bitstream. The level indicated by library_level_idc varies based on the value of library_level_idc.

If it is determined, by using library_picture_enable_flag, that the video bitstream is allowed to be decoded by referencing the library picture corresponding to the library picture bitstream, and it is determined, by using library_same_standard_flag, that the video bitstream and the library picture bitstream use the same standard, the decoding capability information of the library picture bitstream is obtained by using Table 3. The decoding capability information of the library picture bitstream may be obtained by parsing library_level_present flag in Table 3 and syntax elements below library_level_present flag in Table 3. Correspondingly, the encoder determines values of syntax elements in profile_tier_level based on the library picture bitstream, to obtain the decoding capability information, described by profile_tier_level, of the library picture bitstream.

In a third obtaining manner, a profile flag is parsed from the video bitstream, and the profile flag is used to indicate a profile to which the library picture bitstream belongs. A level flag is parsed from the video bitstream, and the level flag is used to indicate a level to which the library picture bitstream belongs. The decoding capability information indicated by the profile flag and the level flag is used as the decoding capability information of the library picture bitstream.

Figure 8B:
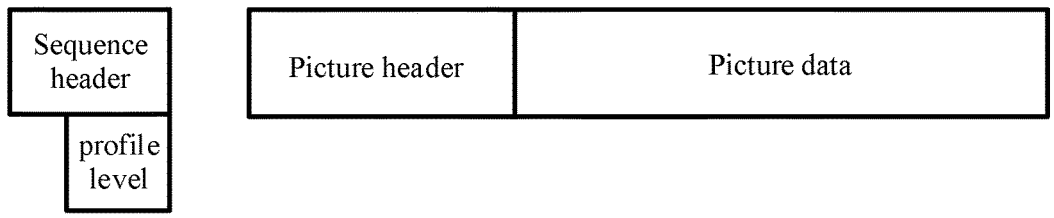
FIG. 8B is a schematic diagram of a location of decoding capability information in a bitstream according to an embodiment of this application.

The decoding capability information of the video bitstream is located in the sequence header of the video bitstream, and the decoding capability information of the video bitstream includes the profile flag and the level flag. In addition, the decoding capability information of the video bitstream includes but is not limited to information such as a maximum bit rate of the video bitstream and a minimum size of a DPB required for decoding the bitstream. The profile flag and the level flag may be determined based on the information such as the maximum bit rate of the video bitstream and the minimum size of the decoded image buffer required for decoding the bitstream. The parsing manner may be applied to a video bitstream using the AVS3 standard. Refer to FIG. 8B. The video bitstream includes a sequence header and picture-related data obtained by encoding a picture sequence that constitutes a video. The picture-related data includes a picture header and picture data. The profile flag and the level flag in the sequence header of the video bitstream are used to indicate the decoding capability information of the library picture bitstream. For a syntax table of the sequence header of the video bitstream, refer to the following Table 4:

TABLE 4

| Sequence header definition | Descriptor |
| --- | --- |
| sequence_header( ){ | |
| video_sequence_start_code | f(32) |
| profile_id | u(8) |
| level_id | u(8) |
| library_picture_enable_flag | u(1) |
| if(library_picture_enable_flag) { | |
| library_same_standard_flag | u(1) |
| if(library_same_standard_flag) { | |
| profile_id_library | u(8) |
| level_id_library | u(8) |
| } | |
| } | |
| (The remaining syntax is omitted) | |
| } | |

The library_picture_enable_flag is an example of the library picture reference flag. When the value is the first value (for example, may be 1), it indicates that the video bitstream is allowed or required to be decoded by referencing the library picture corresponding to the library picture bitstream. When the value is the second value (for example, may be 0), it indicates that the video bitstream is not allowed to be decoded by referencing the library picture corresponding to the library picture bitstream, or indicates that the video bitstream is not necessarily allowed or not required to be decoded by referencing the library picture corresponding to the library picture bitstream.

The library_same_standard_flag is an example of the same standard flag. When the value is the first value (for example, may be 1), it indicates that the video bitstream and the library picture bitstream referenced by the video bitstream use the same standard. When the value is the second value (for example, may be 0), it indicates that the video bitstream and the library picture bitstream referenced by the video bitstream use different standards, or indicates that the video bitstream and the library picture bitstream referenced by the video bitstream do not necessarily use or are not required to use the same standard.

The profile_id_library is an example of the profile flag, and is used to indicate a profile to which the library picture bitstream referenced by the video bitstream belongs.

The level_id_library is an example of the level flag, and is used to indicate a level to which the library picture bitstream referenced by the video bitstream belongs.

Correspondingly, the decoder performs parsing in the following manner:

(1) Parse library_picture_enable_flag to determine whether the video bitstream is allowed (or required) to be decoded by referencing the library picture corresponding to the library picture bitstream.

(2) If the video bitstream is allowed or required to be decoded by referencing the library picture corresponding to the library picture bitstream, parse library_same_standard_flag to determine whether the video bitstream and the library picture bitstream allowed or required to be referenced by the video bitstream use the same standard.

(3) If the video bitstream and the library picture bitstream allowed or required to be referenced by the video bitstream use the same standard, further parse the decoding capability information that is of the library picture bitstream and that is included in profile_id_library and level_id_library.

An encoder performs encoding as follows:

(1) Obtain a current to-be-encoded picture.

(2) Determine a value of a library picture reference flag (for example, may be library_picture_enable_flag) based on whether the current to-be-encoded picture is allowed (or required) to be encoded by referencing a library picture corresponding to a library picture bitstream.

The encoding-side method may further include determining whether the current to-be-encoded picture is allowed (or required) to be encoded by referencing the library picture corresponding to the library picture bitstream. Further, this may be determined based on a rate-distortion cost or another indicator for measuring encoding efficiency or encoding performance.

(3) If the current to-be-encoded picture is allowed (or required) to be encoded by referencing the library picture corresponding to the library picture bitstream, encode the current to-be-encoded picture to obtain encoded data. Determine, based on whether the referenced library picture bitstream and the encoded data use a same standard, a value of a same standard flag (for example, may be library_same_standard_flag).

(4) If the referenced library picture bitstream and the encoded data use the same standard, add the library picture reference flag, the same standard flag, and the profile flag and the level flag (for example, may be profile_id_library and level_id_library) to the encoded data. The profile flag and the level flag are used to indicate the decoding capability information of the library picture bitstream. The profile flag is used to indicate the profile to which the library picture bitstream belongs, and the level flag is used to indicate the level to which the library picture bitstream belongs.

An adding manner has been described in the first obtaining manner. Therefore, details are not described herein again. In addition, the syntax table may further include the library picture flag, to indicate whether the video bitstream is the library picture.

In a fourth obtaining manner, the first flag is located in the sequence header of the video bitstream, and the first flag includes the same parameter flag. The same parameter flag of the library picture bitstream is parsed from the sequence header of the video bitstream. The same parameter flag is used to indicate whether the value of the target parameter of the library picture bitstream is the same as the value of the target parameter in the sequence header of the video bitstream. The target parameter in the sequence header of the video bitstream may include the decoding capability information of the video bitstream. When the same parameter flag is the first value, the same parameter flag is used to indicate that the value of the target parameter of the library picture bitstream is the same as the value of the target parameter in the sequence header of the video bitstream. When the same parameter flag is the second value, the same parameter flag is used to indicate that the value of the target parameter of the library picture bitstream may be different from the value of the target parameter in the sequence header of the video bitstream, or indicate that the value of the target parameter of the library picture bitstream is not necessarily the same as the value of the target parameter in the sequence header of the video bitstream, or indicate that the value of the target parameter of the library picture bitstream is different from the value of the target parameter in the sequence header of the video bitstream.

The parsing manner may also be applied to a video bitstream using the AVS3 standard, but a parameter in the sequence header of the video bitstream is used to indicate the target parameter (which may include the decoding capability information) of the library picture bitstream. For a syntax table of the sequence header of the video bitstream, refer to Table 5:

TABLE 5

| Sequence header definition | Descriptor |
| --- | --- |
| sequence_header( ){ | |
| video_sequence_start_code | f(32) |
| profile_id | u(8) |
| level_id | u(8) |
| is_library_stream_flag | u(1) |
| if(!is_libiary_stream_flag) { | |
| library_picture_enable_flag | u(1) |
| if(library_picture_enable_flag) { | |
| library_stream_using_same_standard_flag | u(1) |
| } | |
| } | |
| (The remaining syntax is omitted) | |
| } | |

The is_libiary_stream_flag is an example of the library picture flag. When the value is the first value (for example, may be 1), it indicates that a current bitstream is the library picture bitstream. When the value is the second value (for example, may be 0), it indicates that the current bitstream is not the library picture bitstream.

The library_picture_enable_flag is an example of the library picture reference flag. When the value is the first value (for example, may be 1), it indicates that the video bitstream is allowed or required to be decoded by referencing the library picture corresponding to the library picture bitstream. When the value is the second value (for example, may be 0), it indicates that the video bitstream is not allowed to be decoded by referencing the library picture corresponding to the library picture bitstream, or indicates that the video bitstream is not necessarily allowed or not required to be decoded by referencing the library picture corresponding to the library picture bitstream.

The library_stream_using_same_standard_flag is an example of the same parameter flag. When the value is the first value (for example, may be 1), it indicates that the value of the target parameter of the library picture bitstream referenced by the video bitstream is the same as the value of the target parameter in the sequence header of the video bitstream. When the value is the second value (for example, may be 0), it indicates that the value of the target parameter of the library picture bitstream referenced by the video bitstream is different from the value of the target parameter in the sequence header of the video bitstream, or indicates that the value of the target parameter of the library picture bitstream referenced by the video bitstream is not necessarily the same or is not required to be the same as the value of the target parameter in the sequence header of the video bitstream. The target parameter is not limited in this application. For example, the target parameter may be all parameters except the library picture flag (for example, may be is_libiary_stream_flag) in the sequence header of the video bitstream, or the target parameter may be one or more of the parameters except the library picture flag (for example, may be is_libiary_stream_flag) in the sequence header of the video bitstream.

Correspondingly, the decoder performs parsing in the following manner:

(1) Parse the library picture flag to determine whether the current bitstream is the library picture bitstream.

(2) If the current bitstream is not the library picture bitstream, parse the library picture reference flag to determine whether the current bitstream is allowed to be decoded by referencing the library picture corresponding to the library picture bitstream.

(3) If the current bitstream is allowed to be decoded by referencing the library picture corresponding to the library picture bitstream, parse the same parameter flag to determine whether the value of the target parameter of the library picture bitstream is the same as the value of the target parameter in the sequence header of the video bitstream.

In this embodiment, the first flag includes the same parameter flag. The same parameter flag is used to indicate whether the value of the target parameter of the library picture bitstream referenced by the video bitstream is the same as the value of the target parameter in the sequence header of the video bitstream. The target parameter in the sequence header of the video bitstream includes the decoding capability information of the video bitstream. Therefore, if the value of the target parameter in a sequence header of the library picture bitstream is the same as the value of the target parameter in the sequence header of the video bitstream, because the target parameter includes the decoding capability information, it indicates that the decoding capability information of the library picture bitstream is the same as the decoding capability information of the video bitstream. The decoding capability information of the video bitstream may be used as the decoding capability information of the library picture bitstream, so that the decoding capability information of the library picture bitstream can be parsed from the video bitstream.

Optionally, the target parameter may be a parameter other than the library picture flag (for example, may be is_libiary_stream_flag), or may be all parameters in the sequence header of the library picture bitstream referenced by the video bitstream. Alternatively, the target parameter may be a parameter other than the library picture flag, or all parameters in the sequence header of the video bitstream.

When all parameter values except the library picture flag (for example, may be is_libiary_stream_flag) in the sequence header of the library picture bitstream referenced by the video bitstream are the same as corresponding parameter values in the video bitstream, in an optional step, the decoder of the video bitstream is used to decode a library layer bitstream. It should be noted that this increases a requirement for the decoder's decoding capability, for example, a requirement for a quantity of frames to be decoded per unit time.

When all parameter values in the sequence header of the library picture bitstream referenced by the video bitstream except the video bitstream are different from the corresponding parameter values in the video bitstream, in an optional step, the decoder outputs information about the library picture bitstream, so that a system can invoke a corresponding decoder to decode the library bitstream. In another optional step, a decoding capability required by the library bitstream is obtained based on a parameter in the sequence header of the library picture bitstream. When the decoding capability required by the library picture bitstream does not exceed a decoding capability required by the video bitstream, a decoder of the video bitstream is used to decode the library layer bitstream. It should be noted that this increases a requirement for the decoder's decoding capability, for example, a requirement for a quantity of frames to be decoded per unit time. Therefore, when the decoding capability required by the library picture bitstream exceeds the decoding capability required by the video bitstream, in an optional step, the decoder outputs information satisfying the library bitstream, so that the system can invoke a corresponding decoder to decode the library picture bitstream. An encoder performs encoding as follows:

(1) Obtain a current to-be-encoded picture.

(2) Determine a value of a library picture flag (for example, may be is_library_stream_flag) based on whether the current to-be-encoded picture is a library picture. It should be understood that the value of the library picture flag may also be obtained by determining, whether a bitstream corresponding to the current to-be-encoded picture is the library picture bitstream. This is not limited herein.

(3) If the current to-be-encoded picture is a video picture instead of the library picture, determine a value of a library picture reference flag (for example, may be library_picture_enable_flag) based on whether the video picture is allowed (or required) to be encoded by referencing the library picture corresponding to the library picture bitstream.

The encoding-side method may further include determining whether the current to-be-encoded picture is allowed (or required) to be encoded by referencing the library picture corresponding to the library picture bitstream. Further, this may be determined based on a rate-distortion cost or another indicator for measuring encoding efficiency or encoding performance.

(3) If the video picture is allowed (or required) to be encoded by referencing the library picture corresponding to the library picture bitstream, a value of a same parameter flag is determined based on a value of a target parameter (which may include decoding capability information) of the library picture bitstream, and the video picture is encoded to obtain encoded data. The library picture flag, the library picture reference flag, and the same parameter flag are added to the encoded data, to obtain a video bitstream. The same parameter flag is used to indicate whether the value of the target parameter of the library picture bitstream is the same as a value of a target parameter in a sequence header of the encoded data. For example, the target parameter of the library picture bitstream may be located in a sequence header of the library picture bitstream. The same parameter flag is used to indicate whether the value of the target parameter in the sequence header of the library picture bitstream is the same as the value of the target parameter in the sequence header of the encoded data.

Regardless of which manner is used, the decoding capability information of the library picture bitstream is obtained from the video bitstream, and decoding of the video bitstream may be triggered based on the obtained decoding capability information of the library picture bitstream.

Step 703: Reconstruct, based on the value of the target parameter of the library picture bitstream referenced by the video bitstream and the library picture bitstream referenced by the video bitstream, to obtain the library picture corresponding to the library picture bitstream referenced by the video bitstream.

Optionally, reconstructing, based on the value of the target parameter (which may include the decoding capability information) of the library picture bitstream referenced by the video bitstream and the library picture bitstream referenced by the video bitstream, to obtain the library picture corresponding to the library picture bitstream referenced by the video bitstream includes determining whether a decoding capability of a to-be-used decoder satisfies a requirement indicated by the decoding capability information of the library picture bitstream referenced by the video bitstream, and when the decoding capability of the to-be-used decoder satisfies the requirement indicated by the decoding capability information of the library picture bitstream referenced by the video bitstream, parsing, by using the to-be-used decoder, the library picture bitstream referenced by the video bitstream to obtain the corresponding library picture referenced by the video bitstream.

For example, if the decoding capability of the decoder of the video bitstream satisfies the requirement of the decoding capability information of the library picture bitstream referenced by the video bitstream, the decoder of the video bitstream predicts the library picture bitstream referenced by the video bitstream, to obtain the library picture, or a decoder that invokes a same kernel or algorithm as that of the decoder of the video bitstream predicts the library picture bitstream referenced by the video bitstream, to obtain the library picture. Then, the video bitstream is decoded based on the library picture corresponding to the library picture bitstream referenced by the video bitstream. To be specific, the video picture corresponding to the video bitstream is obtained through reconstruction based on the video bitstream and the library picture corresponding to the library picture bitstream referenced by the video bitstream.

According to the foregoing descriptions, it can be learned that the decoding capability information of the library picture bitstream referenced by the video bitstream is parsed from the video bitstream, so that it can be determined whether the decoding capability of the decoder of the video bitstream satisfies the decoding capability information of the library picture bitstream referenced by the video bitstream, and the library picture bitstream referenced by the video bitstream can be decoded based on a determining result. If the decoding capability of the decoder of the video bitstream satisfies the requirement of the decoding capability information of the library picture bitstream referenced by the video bitstream, the decoder of the video bitstream may be used to predict the library picture corresponding to the library picture bitstream referenced by the video bitstream, and to reconstruct the video picture corresponding to the video bitstream based on the library picture and the video bitstream, to complete decoding of the video bitstream.

Optionally, the decoding capability of the decoder of the video bitstream does not satisfy the requirement of the decoding capability information of the library picture bitstream referenced by the video bitstream. In this embodiment, the decoder of the video bitstream outputs the decoding capability information of the library picture bitstream referenced by the video bitstream, to invoke a decoder that satisfies the requirement of the decoding capability information of the library picture bitstream referenced by the video bitstream to decode the library picture bitstream referenced by the video bitstream.

In the related technology, two decoders need to be invoked to separately decode the library picture bitstream and the video bitstream. The reason lies in that, when parsing the video bitstream, the decoder can obtain only the decoding capability information of the video bitstream, and the decoding capability information of the video bitstream is not necessarily the same as the decoding capability information of the library picture bitstream. If the decoder that parses the video bitstream is directly used to decode the library picture bitstream, and if the decoding capability required by the decoding capability information of the library picture bitstream is higher than the decoding capability required by the decoding capability information of the video bitstream, the decoder may fail to decode the library picture bitstream. Therefore, in the related technology, two decoders are invoked to separately obtain the decoding capability information of the library picture bitstream and the decoding capability information of the video bitstream, and separately decode the library picture bitstream and the video bitstream.

Compared with the related technology, in the method provided in this embodiment, the video bitstream carries both the decoding capability information of the video bitstream and the decoding capability information of the library picture bitstream referenced by the video bitstream. Therefore, the decoder may obtain, by parsing the video bitstream, the decoding capability information of the video bitstream and the decoding capability information of the library picture bitstream referenced by the video bitstream, to determine whether the decoder satisfies the decoding capability required by the decoding capability information of the library picture bitstream referenced by the video bitstream, and satisfies the decoding capability required by the decoding capability information of the video bitstream. If the decoder satisfies this, the decoder may be used to decode both the video bitstream and the library picture bitstream referenced by the video bitstream, to alternately decode the video bitstream and the library picture bitstream referenced by the video bitstream. For example, the decoder sequentially decodes a first segment of the library picture bitstream, the video bitstream that references the first segment of the library picture bitstream, a second segment of the library picture bitstream, and the video bitstream that references the second segment of the library picture bitstream. If the decoder does not satisfy this, another decoder is invoked to decode the library picture bitstream referenced by the video bitstream.

In an optional implementation, if the decoding capability of the decoder of the video bitstream satisfies the requirement of the decoding capability information of the library picture bitstream referenced by the video bitstream, in addition to a manner in which the decoder of the video bitstream decodes the library picture bitstream referenced by the video bitstream to obtain the library picture, another decoding manner may be selected in this method: the decoder that invokes the same kernel or algorithm as that of the decoder of the video bitstream predicts the library picture bitstream referenced by the video bitstream, to obtain the library picture, and reconstructs, based on the library picture and the video bitstream, to obtain the video picture corresponding to the video bitstream.

Because the decoder invokes the same kernel or algorithm as that of the decoder of the video bitstream, the decoder that invokes the same kernel or algorithm as that of the decoder of the video bitstream is used to decode the library picture bitstream referenced by the video bitstream. This satisfies the decoding capability required by the decoding capability information of the library picture bitstream referenced by the video bitstream, and satisfies the decoding capability required by the decoding capability information of the video bitstream.

In conclusion, the video bitstream is used to carry the target parameter of the library picture bitstream in this application. When the video bitstream is allowed to be decoded by referencing the library picture corresponding to the library picture bitstream, the first flag is parsed from the video bitstream. When the first flag is the first value, the value of the target parameter of the video bitstream is used as the value of the target parameter of the library picture bitstream referenced by the video bitstream, so that the library picture is obtained through reconstruction based on the value of the target parameter of the library picture bitstream referenced by the video bitstream and the library picture bitstream referenced by the video bitstream. Further, the video picture corresponding to the video bitstream may be obtained through reconstruction based on the video bitstream and the library picture corresponding to the library picture bitstream referenced by the video bitstream. In the solution provided in this embodiment of this application, the library picture bitstream and the video bitstream share parameters. Therefore, a decoding manner is comparatively flexible, and decoding efficiency is high.

Figure 9:
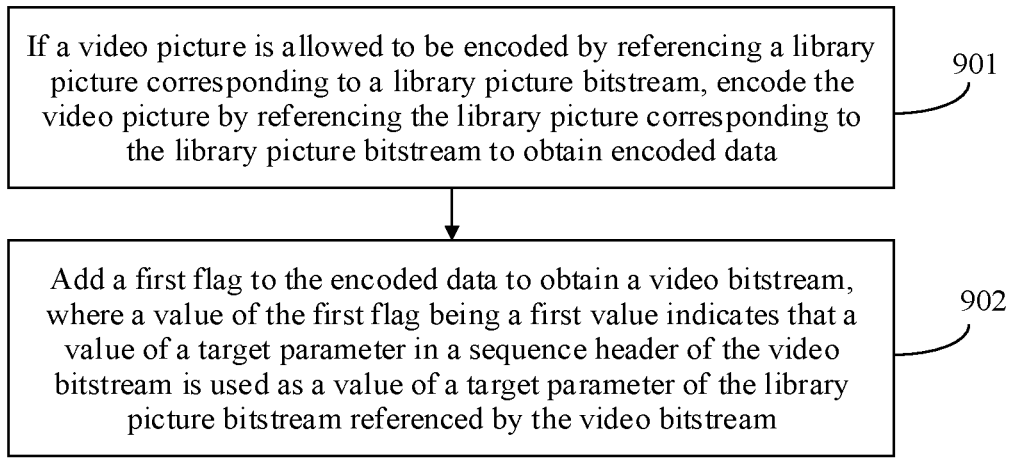
FIG. 9 is a flowchart of a video encoding method for implementing an embodiment of this application.

Based on a same idea, an embodiment of this application further provides a video encoding method. The method may be applied to implementation environments shown in FIG. 1A, FIG. 1B, FIG. 2, FIG. 4, and FIG. 5. Refer to FIG. 9. The method includes the following steps.

Step 901: If a video picture is allowed to be encoded by referencing a library picture corresponding to a library picture bitstream, encode the video picture by referencing the library picture corresponding to the library picture bitstream to obtain encoded data.

The encoding-side method may further include determining whether a current to-be-encoded picture is allowed (or required) to be encoded by referencing the library picture corresponding to the library picture bitstream. Further, this may be determined based on a rate-distortion cost or another indicator for measuring encoding efficiency or encoding performance.

Step 902: Add a first flag to the encoded data to obtain a video bitstream, where a value of the first flag being a first value indicates that a value of a target parameter in a sequence header of the video bitstream is used as a value of a target parameter of the library picture bitstream referenced by the video bitstream.

Optionally, the first flag is located in the sequence header of the video bitstream.

Optionally, the first flag includes a same parameter flag. The same parameter flag is used to indicate whether the value of the target parameter of the library picture bitstream referenced by the video bitstream is the same as the value of the target parameter in the sequence header of the video bitstream. The value of the same parameter flag being the first value indicates that the value of the target parameter of the library picture bitstream is the same as the value of the target parameter in the sequence header of the video bitstream.

Optionally, the video bitstream further includes a library picture reference flag. The library picture reference flag is used to indicate whether the video bitstream is allowed to be decoded by referencing the library picture corresponding to the library picture bitstream.

Optionally, the video bitstream further includes a library picture flag. A value of the library picture flag being a second value indicates that the video bitstream is not the library picture bitstream.

Optionally, the target parameter includes decoding capability information. The decoding capability information is located in a VPS of the encoded data, is located in an SPS of the encoded data, or is located in the sequence header of the video bitstream.

Optionally, the target parameter includes decoding capability information. The decoding capability information includes a profile flag and a level flag. The profile flag is used to indicate a profile to which the library picture bitstream belongs, and the level flag is used to indicate a level to which the library picture bitstream belongs.

In the video encoding method, for steps, information used in the steps, and the like, refer to related content in the foregoing video decoding method. Details are not described herein again.

In conclusion, the video bitstream is used to carry the target parameter of the library picture bitstream in this application. Therefore, the target parameter of the library picture bitstream can be obtained by parsing the video bitstream. During decoding, the library picture corresponding to the library picture bitstream can be predicted based on the value of the target parameter of the library picture bitstream, and the video picture corresponding to the video bitstream is obtained through reconstruction based on the library picture and the video bitstream. In this way, the library picture bitstream and the video bitstream share parameters. Decoding performed by implementing this application is comparatively flexible, and decoding efficiency is high.

Based on a same idea as the foregoing method, an embodiment of this application further provides a video decoding apparatus. The video decoding apparatus may be applied to the destination device 14 shown in FIG. 1A, the decoder 30 shown in FIG. 1B, the decoder 30 shown in FIG.

Figure 13:
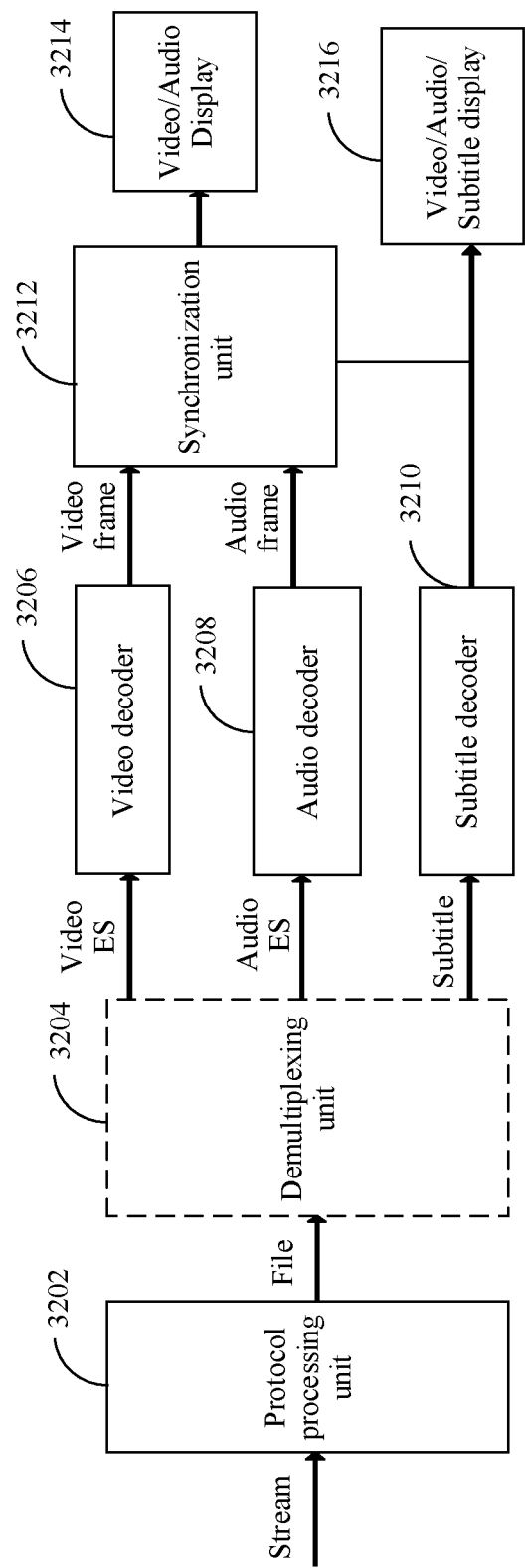
FIG. 13 is a schematic diagram of a structure of a terminal device according to an embodiment of this application.

3, the video coding device 400 shown in FIG. 4, the decoding device 500 shown in FIG. 5, or a video decoder 3206 shown in FIG. 13.

Figure 10:
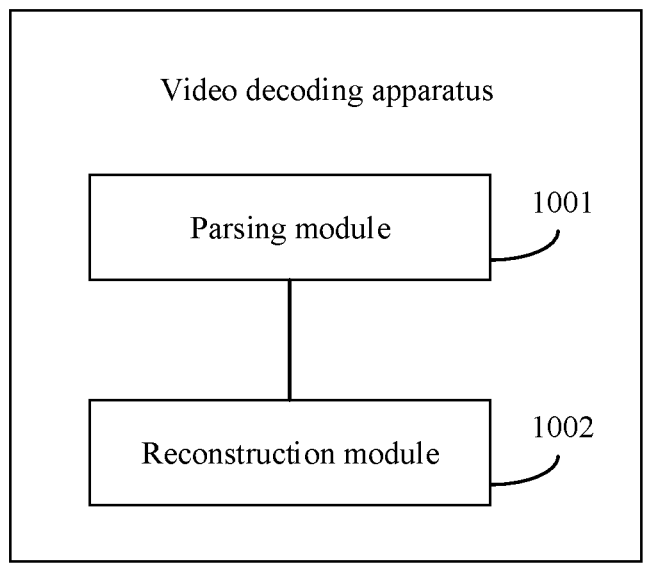
FIG. 10 is a schematic diagram of a structure of a video decoding apparatus according to an embodiment of this application.

Refer to FIG. 10. The apparatus includes a parsing module 1001 and a reconstruction module 1002. The parsing module 1001 and the reconstruction module 1002 may be applied to the decoder 30 of the destination device 14 shown in FIG. 1A, the decoder 30 shown in FIG. 1B, the decoder 30 shown in FIG. 3, an encoding/decoding module 430 shown in FIG. 4, the processor 510 shown in FIG. 5, or a video decoder 3206 shown in FIG. 13.

The parsing module 1001 is configured to, if a video bitstream is allowed to be decoded by referencing a library picture corresponding to a library picture bitstream, parse a first flag from the video bitstream, and when a value of the first flag is a first value, use a value of a target parameter in a sequence header of the video bitstream as a value of a target parameter of the library picture bitstream referenced by the video bitstream.

The reconstruction module 1002 is configured to reconstruct, based on the value of the target parameter of the library picture bitstream referenced by the video bitstream and the library picture bitstream referenced by the video bitstream, to obtain the library picture corresponding to the library picture bitstream referenced by the video bitstream.

Optionally, the reconstruction module 1002 is further configured to reconstruct, based on the video bitstream and the library picture corresponding to the library picture bitstream referenced by the video bitstream, to obtain a video picture corresponding to the video bitstream.

Optionally, the first flag is located in the sequence header of the video bitstream.

Optionally, the first flag includes a same parameter flag. The same parameter flag is used to indicate whether the value of the target parameter of the library picture bitstream referenced by the video bitstream is the same as the value of the target parameter in the sequence header of the video bitstream.

The value of the same parameter flag being the first value indicates that the value of the target parameter of the library picture bitstream is the same as the value of the target parameter in the sequence header of the video bitstream.

Optionally, the target parameter includes decoding capability information. The reconstruction module 1002 is configured to determine whether a decoding capability of a to-be-used decoder satisfies a requirement indicated by the decoding capability information of the library picture bitstream referenced by the video bitstream, and when the decoding capability of the to-be-used decoder satisfies the requirement indicated by the decoding capability information of the library picture bitstream referenced by the video bitstream, parse, by using the to-be-used decoder, the library picture bitstream referenced by the video bitstream, and reconstruct to obtain the library picture corresponding to the library picture bitstream referenced by the video bitstream.

Optionally, the parsing module 1001 is configured to parse a library picture reference flag from the video bitstream, where the library picture reference flag is used to indicate whether the video bitstream is allowed to be decoded by referencing the library picture corresponding to the library picture bitstream, and if a value of the library picture reference flag indicates that the video bitstream is allowed to be decoded by referencing the library picture corresponding to the library picture bitstream, parse the first flag from the video bitstream.

Optionally, a library picture flag is parsed from the video bitstream. A value of the library picture flag is a second value, and the library picture flag being the second value indicates that the video bitstream is not the library picture bitstream.

Optionally, the parsing module 1001 is further configured to obtain the library picture flag from a current bitstream, and use the current bitstream as the video bitstream only when the value of the library picture flag indicates that the video bitstream is not the library picture bitstream, and parse the library picture reference flag from the video bitstream.

Optionally, the target parameter includes the decoding capability information. The parsing module 1001 is further configured to parse the decoding capability information of the library picture bitstream from a VPS of the video bitstream, parse the decoding capability information of the library picture bitstream from an SPS of the video bitstream, or parse the decoding capability information of the library picture bitstream from the sequence header of the video bitstream.

Optionally, the target parameter includes decoding capability information. The decoding capability information of the video bitstream includes a profile flag and a level flag. The profile flag is used to indicate a profile to which the video bitstream belongs, and the level flag is used to indicate a level to which the video bitstream belongs. The parsing module is configured to use the profile flag and the level flag as the decoding capability information of the library picture bitstream referenced by the video bitstream.

Figure 11:
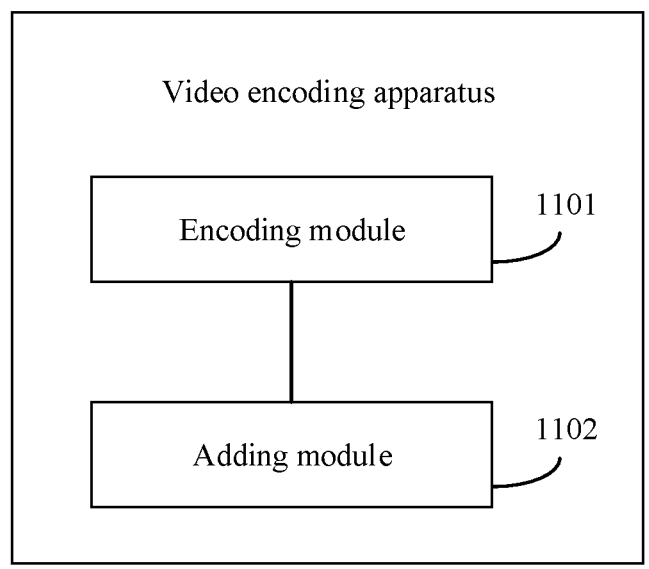
FIG. 11 is a schematic diagram of a structure of a video encoding apparatus according to an embodiment of this application.

An embodiment of this application further provides a video encoding apparatus. The video encoding apparatus may be applied to the source device 12 shown in FIG. 1A, the video coding system 40 shown in FIG. 1B, the encoder 20 shown in FIG. 2, the video coding device 400 shown in FIG. 4, or the coding device 500 shown in FIG. 5. As shown in FIG. 11, the apparatus includes an encoding module 1101 and an adding module 1102. The apparatus may be applied to the encoder 20 shown in FIG. 1A, FIG. 1B, or FIG. 2, or the encoding/decoding module 430 shown in FIG. 4.

The encoding module 1101 is configured to, if a video picture is allowed to be encoded by referencing a library picture corresponding to a library picture bitstream, encode the video picture by referencing the library picture corresponding to the library picture bitstream to obtain encoded data.

The adding module 1102 is configured to add a first flag to the encoded data to obtain a video bitstream. A value of the first flag being a first value indicates that a value of a target parameter in a sequence header of the video bitstream is used as a value of a target parameter of the library picture bitstream referenced by the video bitstream.

Optionally, the first flag is located in the sequence header of the video bitstream.

Optionally, the first flag includes a same parameter flag. The same parameter flag is used to indicate whether the value of the target parameter of the library picture bitstream referenced by the video bitstream is the same as the value of the target parameter in the sequence header of the video bitstream.

The value of the same parameter flag being the first value indicates that the value of the target parameter of the library picture bitstream is the same as the value of the target parameter in the sequence header of the video bitstream.

Optionally, the video bitstream further includes a library picture reference flag. The library picture reference flag is used to indicate whether the video bitstream is allowed to be decoded by referencing the library picture corresponding to the library picture bitstream.

Optionally, the video bitstream further includes a library picture flag. A value of the library picture flag being a second value indicates that the video bitstream is not the library picture bitstream.

Optionally, the target parameter includes decoding capability information. The decoding capability information is located in a VPS of the encoded data, is located in an SPS of the encoded data, or is located in the sequence header of the video bitstream.

Optionally, the target parameter includes decoding capability information. The decoding capability information includes a profile flag and a level flag. The profile flag is used to indicate a profile to which the library picture bitstream belongs, and the level flag is used to indicate a level to which the library picture bitstream belongs.

It should be understood that, when the apparatuses shown in FIG. 10 and FIG. 11 implement functions of the apparatuses, division into the foregoing functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to a same idea. For a specific implementation process thereof, refer to the method embodiments. Details are not described herein again.

An embodiment of this application further provides a video decoding device, including a memory and a processor. The memory stores at least one instruction. The at least one instruction is loaded and executed by the processor, to implement any one of the foregoing video decoding methods provided in the embodiments of this application. For example, the processor may be the decoder 30 shown in FIG. 1A, the decoder 30 shown in FIG. 1B, the decoder 30 shown in FIG. 3, the processor 430 shown in FIG. 4, or the processor 510 shown in FIG. 5.

An embodiment of this application further provides a video encoding device, including a memory and a processor. The memory stores at least one instruction. The at least one instruction is loaded and executed by the processor, to implement any one of the foregoing video encoding methods provided in the embodiments of this application. For example, the processor may be the encoder 20 shown in FIG. 1A, the encoder 20 shown in FIG. 1B, the encoder 20 shown in FIG. 2, the processor 430 shown in FIG. 4, or the processor 510 shown in FIG. 5. The memory may be the memory 44 in FIG. 1B or the memory 530 in FIG. 5.

An embodiment of this application further provides a computer program product. The computer program product includes computer program code. When the computer program code is run by a computer, the computer is enabled to perform the methods in the foregoing aspects. For example, the computer program product may be applied to the decoder 30 shown in FIG. 1A, the decoder 30 shown in FIG. 1B, the decoder 30 shown in FIG. 3, the encoder 20 shown in FIG. 1A, the encoder 20 shown in FIG. 1B, the encoder 20 shown in FIG. 2, the processor 430 shown in FIG. 4, or the processor 510 shown in FIG. 5.

An embodiment of this application further provides a readable storage medium. The readable storage medium stores a program or instructions. When the program or the instructions is or are run on a computer, the methods in the foregoing aspects are performed. For example, the readable storage medium may be applied to the decoder 30 shown in FIG. 1A, the decoder 30 shown in FIG. 1B, the decoder 30 shown in FIG. 3, the encoder 20 shown in FIG. 1A, the encoder 20 shown in FIG. 1B, the encoder 20 shown in FIG. 2, the processor 430 shown in FIG. 4, or the processor 510 shown in FIG. 5.

An embodiment of this application further provides a chip, including a processor. The processor is configured to invoke and run instructions stored in a memory, to enable a communications device on which the chip is installed to perform the methods in the foregoing aspects. For example, the chip may be applied to the source device 12 shown in FIG. 1A, and the processor may be the encoder 20 shown in FIG. 1A. For another example, the chip may be applied to the destination device 14 shown in FIG. 1A, and the processor may be the decoder 30 shown in FIG. 1A. For another example, the chip may be applied to the video coding system 40 shown in FIG. 1B, and the processor may be the decoder 30 or the encoder 20 shown in FIG. 1B. Alternatively, the processor may be the encoder 20 shown in FIG. 2 or the decoder 30 shown in FIG. 3. For another example, the chip may be applied to the video coding device 400 shown in FIG. 4, and the processor may be the processor 510 shown in FIG. 4. For another example, the chip may be applied to the coding device 500 shown in FIG. 5, and the processor may be the processor 430 shown in FIG. 5.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform the methods in the foregoing aspects. For example, the chip may be applied to the source device 12 shown in FIG. 1A, the output interface is the communications interface 22 shown in FIG. 1A, and the processor is the encoder 20 shown in FIG. 1A. For another example, the chip may be applied to the destination device 14 shown in FIG. 1A, the input interface is the communications interface 28 in FIG. 1A, and the processor includes the decoder 30 shown in FIG. 1A. For another example, the chip may be applied to the video coding system 40 shown in FIG. 1i, and the processor is the encoder 20 or the decoder 30 shown in FIG. 1B. Alternatively, the processor may be the encoder 20 shown in FIG. 2, or the processor may be the decoder 30 shown in FIG. 3. The memory is the memory 44 shown in FIG. 1B. For another example, the chip may be applied to the video coding device 400 shown in FIG. 4, the processor is the processor 430 in FIG. 4, the input interface is the ingress port 410 in FIG. 4, the output interface is the egress port 450 in FIG. 4, and the memory is the memory 460 in FIG. 4. For another example, the chip may be applied to the coding device 500 shown in FIG. 5, the processor is the processor 510 in FIG. 5, and the memory is the memory 530 in FIG. 5.

The following describes application of the encoding method and the decoding method shown in the foregoing embodiments, and a system using the encoding method and the decoding method.

Figure 12:
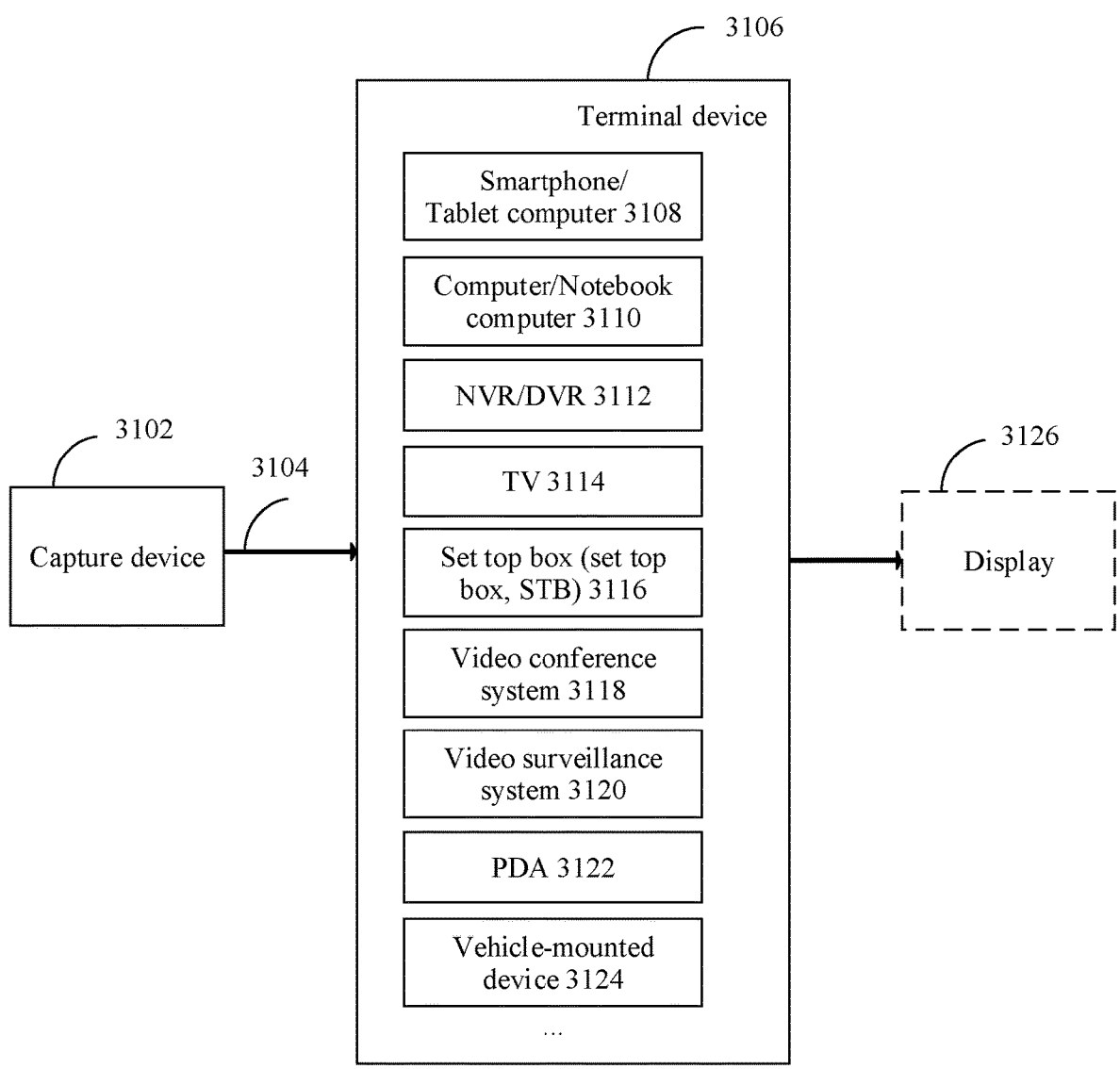
FIG. 12 is a schematic diagram of a structure of a content supply system according to an embodiment of this application.

FIG. 12 is a block diagram of a content supply system 3100 that implements a content delivery service. The content supply system 3100 includes a capture device 3102, a terminal device 3106, and optionally a display 3126. The capture device 3102 communicates with the terminal device 3106 through a communication link 3104. The communication link may include the communications channel 13 described above. The communication link 3104 includes but is not limited to WI-FI, the Ethernet, a wired connection, a wireless ($3^{rd}$ generation (3G)/$4^{th}$ generation (4G)/5th generation (5G)) connection, a Universal Serial Bus (USB), or any type of combination thereof.

The capture device 3102 generates data, and may encode the data according to the encoding method shown in the foregoing embodiments. Alternatively, the capture device 3102 may distribute the data to a streaming server (not shown in FIG. 12), and the server encodes the data and transmits the encoded data to the terminal device 3106. The capture device 3102 includes but is not limited to a camera, a smartphone or a tablet computer, a computer or a notebook computer, a video conference system, a personal digital assistant (PDA), a vehicle-mounted device, or any combination thereof. For example, the capture device 3102 may include the source device 12 described above. When the data includes a video, a video encoder 20 included in the capture device 3102 may actually encode the video. When the data includes audio (that is, voice), an audio encoder included in the capture device 3102 may actually encode the audio. In some actual scenarios, the capture device 3102 distributes encoded video data and encoded audio data by multiplexing the encoded video data and the encoded audio data. In another actual scenario, for example, in a video conference system, the encoded audio data and the encoded video data are not multiplexed. The capture device 3102 separately distributes the encoded audio data and the encoded video data to the terminal device 3106.

In the content supply system 3100, the terminal device 310 receives and reproduces the encoded data. The terminal device 3106 may be a device with data receiving and recovery capabilities, for example, a smartphone or tablet computer 3108, a computer or notebook computer 3110, a network video recorder (NVR)/digital video recorder (DVR) 3112, a television (TV) 3114, a set top box (STB) 3116, a video conference system 3118, a video surveillance system 3120, a PDA 3122, a vehicle-mounted device 3124, or any combination of the foregoing devices that can decode the encoded data. For example, the terminal device 3106 may include the destination device 14 described above. When the encoded data includes a video, a video decoder 30 included in the terminal device is prioritized to perform video decoding. When the encoded data includes audio, an audio decoder included in the terminal device is prioritized to perform audio decoding.

For a terminal device having a display, for example, a smartphone or tablet computer 3108, a computer or notebook computer 3110, an NVR/DVR 3112, a TV 3114, a PDA 3122, or a vehicle-mounted device 3124, the terminal device may feed decoded data to the display of the terminal device. For a terminal device without a display, for example, an STB 3116, a video conference system 3118, or a video surveillance system 3120, an external display 3126 is connected to the terminal device to receive and display decoded data.

When each device in the system performs encoding or decoding, the picture encoding device or the picture decoding device shown in the foregoing embodiments may be used.

FIG. 13 is a diagram of an example structure of the terminal device 3106. After the terminal device 3106 receives a stream from the capture device 3102, the protocol processing unit 3202 analyzes a transmission protocol of the stream. The protocol includes but is not limited to Real-Time Streaming Protocol (RTSP), Hypertext Transfer Protocol (HTTP), HTTP Live Streaming (HLS), MPEG-Dynamic Adaptive Streaming over HTTP (DASH), Real-Time Transport Protocol (RTP), Real-Time Messaging Protocol (RTMP), or any combination thereof.

After processing the stream, the protocol processing unit 3202 generates a stream file. The file is output to a demultiplexing unit 3204. The demultiplexing unit 3204 may separate multiplexed data into encoded audio data and encoded video data. As described above, in another actual scenario, for example, in a video conference system, the encoded audio data and the encoded video data are not multiplexed. In this case, the encoded data is transmitted to the video decoder 3206 and an audio decoder 3208 without through the demultiplexing unit 3204.

Demultiplexing is performed to generate a video elementary stream (ES), an audio ES, and an optional subtitle. The video decoder 3206, which includes the video decoder 30 described in the foregoing embodiment, decodes the video ES by using the decoding method shown in the foregoing embodiment to generate a video frame, and feeds data to a synchronization unit 3212. The audio decoder 3208 decodes the audio ES to generate an audio frame, and feeds data to the synchronization unit 3212. Alternatively, the video frame may be stored in a buffer (not shown in FIG. 13) before the video frame is fed to the synchronization unit 3212. Similarly, the audio frame may be stored in the buffer (not shown in FIG. 13) before the audio frame is fed to the synchronization unit 3212.

The synchronization unit 3212 synchronizes the video frame and the audio frame, and provides a video/audio to a video/audio display 3214. For example, the synchronization unit 3212 synchronizes presentation of video information and audio information. Information may be syntactically encoded by using a timestamp related to presentation of encoded audio data and encoded visual data and a timestamp related to transmission of a data stream.

If the stream includes subtitles, a subtitle decoder 3210 decodes the subtitles to synchronize the subtitles with the video frame and the audio frame, and provides the video/audio/subtitles to a video/audio/subtitle display 3216.

This application is not limited to the foregoing system, and the picture encoding device or the picture decoding device in the foregoing embodiments may be integrated into another system, for example, an automotive system.

The following describes in detail the solutions in the embodiments of this application.

To mine and use information that is mutually referenced during encoding of pictures between a plurality of random access segments, when encoding (or decoding) a picture, an encoder (or a decoder) may select, from a database, a picture whose texture content is similar to that of a currently encoded picture (or a currently decoded picture) as a reference picture. Such a reference picture is referred to as a library picture. A database that stores a set of reference pictures is referred to as a library. A method for coding at least one picture in a video by referencing at least one library picture is referred to as library-based video coding. When a video sequence is encoded by using library-based video coding, a library layer bitstream including a library picture encoding bitstream and a video layer bitstream including a bitstream obtained by encoding frames of pictures in a video sequence by referencing a library picture are generated. A reference relationship between two layers of bitstreams is shown in FIG. 6. The two types of bitstreams are respectively similar to an elementary layer bitstream and an enhanced layer bitstream that are generated by scalable video coding (SVC). In other words, a sequence layer bitstream depends on a library layer bitstream. However, a dual-bitstream organization manner of library-based video coding and a scalable bitstream organization manner of SVC have different dependency relationships between layer bitstreams. A difference lies in that layers of dual bitstreams in SVC depend on each other according to a specific alignment time period, whereas in library-based video coding, the video layer bitstream of dual streams depends on the library layer bitstream according to a non-alignment time period.

A bitstream generated during encoding records decoding capability information required for decoding the bitstream, including information such as a maximum bit rate of the bitstream and a minimum size of a DPB required for decoding the bitstream. The decoder provides a sufficient decoding capability based on the decoding capability information, to ensure accurate and real-time decoding of bitstreams.

A location of decoding capability information in HEVC or VVC in a bitstream is shown in FIG. 8A. A profile level may be located in at least one of a VPS and an SPS. The profile level includes decoding capability information of at least one of the video layer bitstream and the library layer bitstream.

A location of decoding capability information in AVS3 in a bitstream is shown in FIG. 8B.

Two bitstreams are obtained through encoding by using the library-based video coding method a library layer bitstream and a video sequence bitstream (or referred to as a video layer bitstream). Decoding of the video sequence bitstream needs to depend on the library layer bitstream. When the library layer bitstream and the video sequence bitstream use a same decoder, a decoding capability of the decoder needs to support decoding of both the library layer bitstream and the sequence video bitstream. Therefore, a total decoding capability of the library layer bitstream and the video sequence bitstream needs to be recorded in the sequence bitstream. In view of this, the present disclosure provides several implementations.

It should be noted that, in this application, the sequence video bitstream, a current video layer bitstream, and a current bitstream may all be understood as video bitstreams. The library layer bitstream, the library bitstream, an external library bitstream, and an external library layer bitstream may all be understood as library picture bitstreams.

Embodiment 1

A decoding capability (denoted as profile_tier_level) required by a bitstream is recorded in a sequence video bitstream. In addition, if a library layer bitstream referenced by the video sequence bitstream uses a same decoding method (complying with a same standard) as that of the sequence video bitstream, a decoding capability (denoted as profile_tier_level) required by the library layer bitstream is recorded in the sequence video bitstream.

On the basis of HEVC or VVC, the decoding capability information required by the library layer bitstream is placed in a VPS (video parameters set) of the video layer bitstream, and syntax of the VPS may be shown in the following table:

| video_parameter_set_rbsp( ){ | Descriptor |
|---|---|
| (Syntax at the beginning is omitted) | |
| vps_library_picture_enable_flag | u(1) |
| if(vps_library_picture_enable_flag) { | |

| video_parameter_set_rbsp( ){ | Descriptor |
|---|---|
| vps_library_same_standard_flag | u(1) |
| if(vps_library_same_standard_flag) | |
| profile_tier_level(1, 0) | |
| } | |
| (The remaining syntax is omitted) | |
| } | |

Semantics of newly-added syntax elements are as follows:

The vps_library_picture_enable_flag (which may also be referred to as a library picture reference flag) is a 1-bit flag. When a value is 1, it indicates that a current bitstream (or referred to as a current video layer bitstream) references an external library bitstream (the library bitstream may also be referred to as a library layer bitstream). When the value is 0, it indicates that the current bitstream does not reference the library bitstream.

The vps_library_same_standard_flag (which may also be referred to as a same standard flag) is a 1-bit flag. When a value is 1, it indicates that the external library bitstream referenced by the current bitstream complies with a same coding standard as that of the current bitstream. When the value is 0, it indicates that the external library bitstream referenced by the current bitstream does not comply with a standard.

A decoder may perform the following operations:

(1) Parse vps_library_picture_enable_flag to determine whether the current bitstream references the external library bitstream.

(2) When the current bitstream references the external library bitstream, parse vps_library_same_standard_flag to determine whether an external library layer bitstream referenced by the current bitstream complies with the standard.

(3) When the external library bitstream referenced by the current bitstream complies with the standard, parse profile_tier_level to obtain decoding capability information required by a library layer bitstream. It should be noted that profile_tier_level that includes the decoding capability information required by the library layer bitstream may be located in the VPS. Further, profile_tier_level that includes the decoding capability information required by the library layer bitstream may be independent of related-technology profile_tier_level, or may be a further expansion of the related-technology profile tier_level.

In an optional step, when a decoding capability of the decoder of the current bitstream satisfies a requirement of the decoding capability information required by the library layer bitstream, the decoder of the current bitstream may be further used to decode the library layer bitstream. It should be noted that this increases a requirement for the decoder's decoding capability, for example, a requirement for a quantity of frames to be decoded per unit time.

When the external library bitstream referenced by the current bitstream does not comply with the standard or the decoding capability of the decoder of the current bitstream does not satisfy the requirement of the decoding capability information required by the library layer bitstream, in an optional step, the decoder outputs information about a standard with which the library bitstream complies, so that a system can invoke a corresponding decoder to decode the library bitstream.

An encoder may perform the following operations:

(1) Determine, based on whether a current bitstream references an external library bitstream, a value of vps_library_picture_enable_flag in the bitstream.

(2) When the current bitstream references the external library bitstream, determine, based on whether the external library layer bitstream referenced by the current bitstream complies with the standard, the value of vps_library_same_standard_flag in the bitstream.

(3) When the external library bitstream referenced by the current bitstream complies with the standard, use, in the bitstream, profile_tier_level to describe decoding capability information required by a library layer bitstream. In an optional step, the encoder of the current bitstream may be further used to encode the library layer bitstream. It should be noted that this increases a requirement for the encoder's decoding capability, for example, a requirement for a quantity of frames to be encoded per unit time.

When the external library bitstream referenced by the current bitstream does not comply with the standard, in an optional step, the encoder outputs information about a standard with which the library bitstream complies, so that a system can invoke a corresponding encoder to encode the library bitstream.

It should be noted profile_tier_level that includes the decoding capability information required by the library layer bitstream may be profile_tier_level obtained after the decoding capability information required by the library layer bitstream is added to related-technology profile_tier_level, or may be profile_tier_level that is independent of the related-technology profile_tier_level.

Embodiment 2

On the basis of HEVC or VVC, decoding capability information required by a library layer bitstream is placed in an SPS (sequence parameters set) of a video layer bitstream, and syntax of the SPS is shown in the following table:

| seq_parameter_set_rbsp( ){ | Descriptor |
|---|---|
| (Syntax at the beginning is omitted) | |
| sps_library_picture_enabale_flag | u(1) |
| if(sps_library_picture_enable_flag) { | |
| sps_library_same_standard_flag | u(1) |
| if(sps_library_same_standard_flag) | |
| profile_tier_level(1, 0) | |
| } | |
| (The remaining syntax is omitted) | |
| } | |

Semantics of newly-added syntax elements are as follows:

The sps_library_picture_enable_flag (which may also be referred to as a library picture reference flag) is a 1-bit flag. When a value is 1, it indicates that a current bitstream references an external library bitstream. When the value is 0, it indicates that the current bitstream does not reference the library bitstream.

The sps_library_same_standard_flag (which may also be referred to as a same standard flag) is a 1-bit flag. When a value is 1, it indicates that the external library bitstream referenced by the current bitstream complies with a same coding standard as that of the current bitstream. When the value is 0, it indicates that the external library bitstream referenced by the current bitstream does not comply with a standard.

A decoder may perform the following operations:

(1) Parse sps_library_picture_enable_flag to determine whether the current bitstream references the external library bitstream.

(2) When the current bitstream references the external library bitstream, parse sps_library_same_standard_flag to determine whether the external library layer bitstream referenced by the current bitstream complies with the standard.

(3) When the external library bitstream referenced by the current bitstream complies with the standard, parse profile_tier_level (1, 0) to obtain the decoding capability information required by the library layer bitstream. In an optional step, when a decoding capability of the decoder of the current bitstream satisfies a requirement of the decoding capability information required by the library layer bitstream, the decoder of the current bitstream may be further used to decode the library layer bitstream. It should be noted that this increases a requirement for the decoder's decoding capability, for example, a requirement for a quantity of frames to be decoded per unit time. It should be noted that profile_tier_level that includes the decoding capability information required by the library layer bitstream may be located in the SPS. Further, profile_tier_level that includes the decoding capability information required by the library layer bitstream may be independent of related-technology profile_tier_level, or may be a further expansion of the related-technology profile tier_level.

When the external library bitstream referenced by the current bitstream does not comply with the standard or the decoding capability of the decoder of the current bitstream does not satisfy the requirement of the decoding capability information required by the library layer bitstream, in an optional step, the decoder outputs information about a standard with which the library bitstream complies, so that a system can invoke a corresponding decoder to decode the library bitstream.

An encoder may perform the following operations:

(1) Determine, based on whether a current bitstream references an external library bitstream, a value of vps_library_picture_enable_flag in the bitstream.

(2) When the current bitstream references the external library bitstream, determine, based on whether the external library layer bitstream referenced by the current bitstream complies with the standard, the value of vps_library_same_standard_flag in the bitstream.

(3) When the external library bitstream referenced by the current bitstream complies with the standard, use, in the bitstream, profile_tier_level (1, 0) to describe the decoding capability information required by the library layer bitstream. In an optional step, the encoder of the current bitstream may be further used to encode the library layer bitstream. It should be noted that this increases a requirement for the encoder's decoding capability, for example, a requirement for a quantity of frames to be encoded per unit time.

When the external library bitstream referenced by the current bitstream does not comply with the standard, in an optional step, the encoder outputs information about a standard with which the library bitstream complies, so that a system can invoke a corresponding encoder to encode the library bitstream.

It should be noted profile_tier_level that includes the decoding capability information required by the library layer bitstream may be profile_tier_level obtained after the decoding capability information required by the library layer bitstream is added to related-technology profile_tier_level, or may be profile_tier_level that is independent of the related-technology profile_tier_level.

Embodiment 3

On the basis of AVS3, decoding capability information required by a library layer bitstream is placed in a sequence header of a video layer bitstream, and syntax of the sequence header is shown in the following table:

| Sequence header definition | Descriptor |
|---|---|
| sequence_header( ){ | |
|     video_sequence_start_code | f(32) |
|     profile_id | u(8) |
|     level_id | u(8) |
|     library_picture_enable_flag | u(1) |
|     if(library_picture_enable_flag) { | |
|       library_same_standard_flag | u(1) |
|       if(library_same_standard_flag) { | |
|         profile_id_library | u(8) |
|           level_id_library | u(8) |
|       } | |
|     } | |
| (The remaining syntax is omitted) | |
| } | |

Semantics of newly-added syntax elements are as follows:

The library_picture_enable_flag (which may also be referred to as a library picture reference flag) is a 1-bit flag. When a value is 1, it indicates that a current bitstream references an external library bitstream. When the value is 0, it indicates that the current bitstream does not reference the library bitstream. (This flag already exists in AVS3.)

The library_same_standard_flag (which may also be referred to as a same standard flag) is a 1-bit flag. When a value is 1, it indicates that the external library bitstream referenced by the current bitstream complies with a same coding standard as that of the current bitstream. When the value is 0, it indicates that the external library bitstream referenced by the current bitstream does not comply with a standard.

The profile_id_library is a fixed-length bit unsigned integer (for example, a length of 8 bits, and a length of 9 bits). profile_id_library indicates a profile to which the external library bitstream referenced by the current bitstream conforms, or indicates a level of the external library bitstream.

The level_id_library is a fixed-length bit unsigned integer (for example, a length of 8 bits, and a length of 9 bits). level_id_library indicates a level to which the external library bitstream referenced by the current bitstream conforms, or indicates a level of the external library bitstream.

It should be noted that, in AVS3, different decoding capabilities correspond to different profiles, the profiles are subdivided into levels, and different levels correspond to different decoding capabilities.

A decoder may perform the following operations:

(1) Parse library_picture_enable_flag to determine whether a current bitstream references an external library bitstream.

(2) When the current bitstream references the external library bitstream, parse library_same_standard_flag to determine whether the external library layer bitstream referenced by the current bitstream complies with the standard.

(3) When the external library bitstream referenced by the current bitstream complies with the standard, parse profile_id_library and level_id_library to obtain the decoding capability information required by the library layer bitstream. In an optional step, when a decoding capability of the decoder of the current bitstream satisfies a requirement of the decoding capability information required by the library layer bitstream, the decoder of the current bitstream may be further used to decode the library layer bitstream. It should be noted that this increases a requirement for the decoder's decoding capability, for example, a requirement for a quantity of frames to be decoded per unit time.

When the external library bitstream referenced by the current bitstream does not comply with the standard or the decoding capability of the decoder of the current bitstream does not satisfy the requirement of the decoding capability information required by the library layer bitstream, in an optional step, the decoder outputs information about a standard with which the library bitstream complies, so that a system can invoke a corresponding decoder to decode the library bitstream.

An encoder may perform the following operations:

(1) Determine, based on whether a current bitstream references an external library stream, a value of library_picture_enable_flag in the bitstream.

(2) When the current bitstream references the external library bitstream, determine, based on whether the external library layer bitstream referenced by the current bitstream complies with the standard, a value of library_same_standard_flag in the bitstream.

(3) When the external library bitstream referenced by the current bitstream complies with the standard, describe, in the bitstream, profile_id_library and level_id_library corresponding to the decoding capability information required by the library layer bitstream. In an optional step, the encoder of the current bitstream is used to encode the library layer bitstream. It should be noted that this increases a requirement for the encoder's decoding capability, for example, a requirement for a quantity of frames to be encoded per unit time.

When the external library bitstream referenced by the current bitstream does not comply with the standard, in an optional step, the encoder outputs information about a standard with which the library bitstream complies, so that a system can invoke a corresponding encoder to decode the library bitstream.

It should be noted profile_tier_level that includes the decoding capability information required by the library layer bitstream may be profile_tier_level obtained after the decoding capability information required by the library layer bitstream is added to related-technology profile_tier_level, or may be profile_tier_level that is independent of the related-technology profile_tier_level.

Embodiment 4

On the basis of AVS3, decoding capability information required by a library layer bitstream is placed in a sequence header of a video layer bitstream, and syntax of the sequence header is shown in the following table:

| Sequence header definition | Descriptor |
|---|---|
| sequence_header( ){ | |
|     video_sequence_start_code | f(32) |
|     profile_id | u(8) |
|     level_id | u(8) |
|     is_libiary_stream_flag | u(1) |
|     if(!is_libiary_stream_flag) { | |
|       library_picture_enable_flag | u(1) |
|       if(library_picture enable_flag) { | |
|     library_stream_using_same_standard_flag | u(1) |
|       } | |
|     } | |
| (The remaining syntax is omitted) | |
| } | |

Semantics of newly-added syntax elements are as follows:

The is_libiary_stream_flag (which may also be referred to as a library picture flag) is a 1-bit flag. A value '1' indicates that a current bitstream is the library picture bitstream, and only an intra-coded picture (for example, an I picture) is allowed to appear in the bitstream, and an inter-coded picture (for example, a P picture or a B picture) is not allowed to appear in the bitstream. A value '0' indicates that the current bitstream is a non-library picture bitstream, namely, a sequence bitstream.

The library_picture_enable_flag (which may also be referred to as a library picture reference flag) is a 1-bit flag. When a value is 1, it indicates that a current bitstream references an external library bitstream. When the value is 0, it indicates that the current bitstream does not reference the library bitstream. (This flag already exists in AVS3.)

The library_stream_using_same_standard_flag (which may also be referred to as a same parameter flag): A value '1' indicates that all parameter values except is_libiary_stream_flag in a sequence header of the external library picture bitstream referenced by a current sequence bitstream should be the same as parameter values in the current sequence bitstream. A value '0' indicates that all parameter values except is_libiary_stream_flag in the sequence header of the library picture bitstream referenced by the current sequence bitstream may be different from the parameter values in a sequence header of the current sequence bitstream.

It should be noted that a meaning of library_stream_using_same_standard_flag may also be a meaning of library_same_standard_flag.

A decoder may perform the following operations:

(1) Parse is_library_stream_flag to determine whether a current bitstream is a library bitstream or a non-library bitstream.

(2) When the current bitstream is a non-library bitstream, parse library_picture_enable_flag to determine whether the current bitstream references an external library bitstream.

(3) When the current bitstream references the external library bitstream, parse library_stream_using_same_standard_flag, to determine whether all parameter values except is_libiary_stream_flag in a sequence header of the external library layer bitstream referenced by the current bitstream are the same as corresponding parameter values in a current sequence bitstream.

When all parameter values except is_libiary_stream_flag of the external library bitstream referenced by the current bitstream are the same as corresponding parameter values in the current sequence bitstream, in an optional step, the decoder of the current bitstream is used to decode the library layer bitstream. It should be noted that this increases a requirement for the decoder's decoding capability, for example, a requirement for a quantity of frames to be decoded per unit time.

When all parameter values except is_libiary_stream_flag of the external library bitstream referenced by the current bitstream are different from corresponding parameter values in the current sequence bitstream, in an optional step, the decoder outputs information about a standard with which the library bitstream complies, so that a system can invoke a corresponding decoder to decode the library bitstream.

In an optional step, a decoding capability required by the library bitstream is obtained based on a parameter in the sequence header of the library bitstream. When the decoding capability required by the library bitstream does not exceed a decoding capability required by the current bitstream, the decoder of the current bitstream is used to decode the library layer bitstream. It should be noted that this increases a requirement for the decoder's decoding capability, for example, a requirement for a quantity of frames to be decoded per unit time. Therefore, when the decoding capability required by the library bitstream exceeds the decoding capability required by the current bitstream, in an optional step, the decoder outputs information about a standard with which the library bitstream complies, so that a system can invoke a corresponding decoder to decode the library bitstream.

In an optional step, when all parameter values except is_libiary_stream_flag of the external library bitstream referenced by the current bitstream are the same as corresponding parameter values in the current sequence bitstream, the decoding capability required by the library bitstream is determined based on a parameter in the sequence header of the current bitstream. When the decoding capability required by the library bitstream does not exceed the decoding capability required by the current bitstream, the decoder of the current bitstream is used to decode the library layer bitstream. When the decoding capability required by the library bitstream exceeds the decoding capability required by the current bitstream, in an optional step, the decoder outputs the information about the standard with which the library bitstream complies, so that the system can invoke the corresponding decoder to decode the library bitstream.

An encoder may perform the following operations:

(1) Determine, based on whether a current bitstream is a library bitstream or a non-library bitstream, a value of is_library_stream_flag in the bitstream.

(2) When the current bitstream is a non-library bitstream, determine, based on whether the current bitstream references an external library bitstream, a value of library_picture_enable_flag in the bitstream.

When the current bitstream references the external library bitstream, determine a value of library_stream_using_same_standard_flag in the bitstream based on whether all parameter values except is_libiary_stream_flag in a sequence header of the external library layer bitstream referenced by the current bitstream are the same as corresponding parameter values in a current sequence bitstream.

When all the parameter values except is_libiary_stream_flag in the sequence header of the external library bitstream referenced by the current bitstream are the same as the parameter values in the current sequence bitstream, in an optional step, the encoder of the current bitstream is used to encode the library layer bitstream. It should be noted that this increases a requirement for the encoder's encoding capability, for example, a requirement for a quantity of frames to be encoded per unit time.

When all the parameter values except is_libiary_stream_flag of the external library bitstream referenced by the current bitstream are different from the corresponding parameter values in the current sequence bitstream, in an optional step, the encoder outputs information about standard with which the library bitstream complies, so that a system can invoke a corresponding encoder to encode the library bitstream.

In an optional step, it is determined, based on an encoding capability required by the library bitstream, that the encoding capability required by the library bitstream does not exceed an encoding capability required by the current bitstream, the encoder of the current bitstream is used to encode the library layer bitstream. It should be noted that this increases a requirement for the encoder's encoding capability, for example, a requirement for a quantity of frames to be encoded per unit time.

The following table shows new profile_tier_level defined in HEVC and VVC. The new profile_tier_level not only includes decoding capability information of a corresponding video layer bitstream, but also includes decoding capability information of a library layer bitstream referenced by the corresponding bitstream. The new profile_tier_level may be a further expansion of related-technology profile_tier_level, and syntax of the new profile_tier_level may be shown in the following table:

| profile_tier_level(profilePresentFlag, maxNumSubLayersMinus1) { | Descriptor |
|---|---|
| if(profilePresentFlag) { | |
|   general_profile_space | u(2) |
|   (The middle part is omitted) | |
|   general_reserved_zero_bit | u(1) |
| } | |
|   general_level_idc | u(8) |
|   (The middle part is omitted) | |
|   for(i=0; i<maxNumSubLayersMinus1;i++){ | |
| (The middle part is omitted) | |
| if(sub_layer_level_present_flag[i]) | |
|     sub_layer_level_idc[i] | u(8) |
| } | |
|   if(library_picture_enable_flag){ | |
|     library_same_standard_flag | u(1) |
|     if(library_same_standard_flag) | |
|       library_level_present_flag | u(1) |
|     if(library_profile_same_standard_flag){ | |
|   library_profile_space | u(2) |
|   library_tier_flag | u(1) |
|   library_profile_idc | u(5) |
|   for( j = 0; j < 32; j++ ) | |
|   library_profile_compatibility_flag[ j ] | u(1) |
|   library_progressive_source_flag | u(1) |
|   library_interlaced_source_flag | u(1) |
|   library_non_packed_constraint_flag | u(1) |
|   library_frame_only_constraint_flag | u(1) |
|   if( library_profile_idc= = 4 \|\| | |
| library_profile_compatibility_flag[ 4 ] | |
| \|\| library_profile_idc = = 5 \|\| | |
| library_profile_compatibility_flag[ 5 ] | |
| \|\| library_profile_idc = = 6 \|\| | |
| library_profile_compatibility_flag[ 6 ] | |
| \|\| library_profile idc = = 7 \|\| | |
| library_profile_compatibility_flag[ 7 ] ) { /* The number of bits in this syntax structure is not affected by this condition */ | |
|   library_max_12bit_constraint_flag | u(1) |
|   library_max_10bit_constraint_flag | u(1) |
|   library_max_8bit_constraint_flag | u(1) |
|   library_max_422chroma_constraint_flag | u(1) |
|   library_max_420chroma_constraint_flag | u(1) |
|   library_max_monochrome_constraint_flag | u(1) |
|   library_intra_constraint_flag | u(1) |
|   library_one_picture_only_constraint_flag | u(1) |
|   library_lower_bit_rate_constraint_flag | u(1) |
|   } else | |
|   library_reserved_zero_43bits | u(43) |
| if( ( library_profile_idc>= 1 && library_profile_idc <= 5 ) \|\| | |
| library_profile_compatibility_flag[ 1 ]\|\| | |
| library_profile_compatibility_flag[ 2 ] \|\| | |
| library_profile_compatibility_flag[ 3 ] \|\| | |
| library_profile_compatibility_flag[ 4 ] \|\| | |
| library_profile_compatibility_flag[ 5 ] ) /* The number of bits in this syntax structure is not affected by this condition */ | |
|   library_inbld_flag | u(1) |
|   else | |
|   library_reserved_zero_bit | u(1) |
| } | |
| if( library_level_present_flag) | |
|   library_level_idc | u(8) |
| } | |
| } | |

It should be noted that the foregoing syntax table may be combined with Embodiment 1, Embodiment 2, or Embodiment 3, or may be implemented as an independent solution.

For example, the foregoing syntax table is combined with the related technology to directly replace profile_tier_level in the related technology, or may be implemented by using a function having profile_tier_level.

The library_picture_enable_flag in the foregoing syntax may be vps_library_picture_enable_flag, sps_library_picture_enabale_flag, or library_picture_enable_flag in the foregoing embodiments. library_same_standard_flag in the foregoing syntax may be vps_library_same_standard_flag, sps_library_same_standard_flag, or library_same_standard_flag in the foregoing embodiments.

It should be noted in the foregoing syntax that profile_tier_level that includes the decoding capability information required by the library layer bitstream may be located in a VPS, an SPS, or a sequence header of an encoded bitstream.

Further, semantics of the newly-added syntax elements may be as follows:

The library_same_standard_flag indicates whether a current profile includes a profile of the library bitstream. When a value is 1, it indicates that the external library bitstream referenced by the current bitstream complies with a same coding standard as that of the current bitstream, and the decoding capability information of the library bitstream is described in the current bitstream. When the value is 0, it indicates that the external library bitstream referenced by the current bitstream does not comply with the standard, and the decoding capability information of the library bitstream is not described in the current bitstream.

The library_level_present_flag indicates whether the current profile includes a level of the library bitstream. When a value is 1, it indicates that the current profile includes a level of the external library bitstream referenced by the current bitstream. When the value is 0, it indicates that the current profile does not include the level of the external library bitstream referenced by the current bitstream.

The library_profile_space is used to specify library_profile_idc and a context of library_profile_compatibility_flag [j] with j ranging from 0 to 31. A value should be 0 in the bitstream that complies with the standard. Other values are reserved for future International Telecommunication Union (ITU) Telecommunication Standardization Sector (ITU-T) or International Organization for Standardization (ISO)/ International Electrotechnical Commission (IEC). A decoder side should ignore an encoded video sequence if the value is not equal to 0.

The library_tier_flag indicates a layer context of library_profile_idc.

The library_profile_idc: When library_profile_space is 0, library_profile_idc indicates a previously-defined profile to which an encoded video sequence conforms. The bitstream cannot include a library_profile_idc value that is not previously defined. Other values are reserved for future ITU-T or ISO/IEC.

A value of library_profile_compatibility_flag[j] should, when library_profile_space is 0, be 1, and indicates a previously defined profile to which the encoded video sequence conforms when library_profile_idc is j. When library_profile_space is 0, a value of library_profile_compatibility_flag[library_profile_idc] should be 1. For j corresponding to not previously defined library_profile_idc, the value of library_profile_compatibility_flag[j] should be 0.

The library_progressive_source_flag and library_interlaced_source_flag are explained as follows:

When library_progressive_source_flag is 1 and library_interlaced_source_flag is 0, a scan type of a picture source in the encoded video sequence can only be progressive.

When library_progressive_source_flag is 0 and library_interlaced_source_flag is 1, a scan type of a picture source in the encoded video sequence can only be interlaced.

When library_progressive_source_flag and library_interlaced_source_flag are both 0, a scan type of a picture source in the encoded video sequence is unknown or undefined.

When library_progressive_source_flag and library_interlaced_source_flag are both 1, a scan type of a picture source in the encoded video sequence is defined in a picture-level syntax element source_scan_type, and the element is stored in additional enhancement information of a time sequence of a picture.

When a value of library_non_packed_constraint_flag is 1, it indicates that no additional enhancement information is provided for frame-level packaging or for frame-level packaging of partitioned rectangle subblocks in the encoded video sequence. When the value is 0, it indicates that one or more pieces of additional enhancement information may be provided for frame-level packaging or for frame-level partitioned rectangle packaging in the encoded video sequence.

When a value of library_frame_only_constraint_flag is 1, it indicates that field_seq_flag is 0. When the value is 0, it indicates that field_seq_flag may or may not be 0.

When values of library_max_12bit_constraint_flag, library_max_10bit_constraint_flag, library_max_8bit_constraint_flah, library_max_422chroma_constraint_flag, library_max_420chroma_constraint_flag, library_max_monochrome_constraint_flag, library_intra_constraint_flag, library_one_picture_only_constraint, and library_lower_bit_rate_constraint_flag exist, library_profile_idc and library_profile_compatibility_flag[j] of a profile conform to previously-defined values and have same semantics as the previously-defined semantics. When a value of peofilePresentFlag is 1, library_profile_idc is not in a range of 4 to 7. When a value of j is in the range of 4 to 7, library_profile_compatibility_flag[j] is not 1. In this case, none of these syntax elements exists and the values can be inferred to be 0. When library_profile_idc is not in the range of 4 to 7, j is in the range of 4 to 7, and library_profile_compatibility_flag[j] is not 1, the values of these syntax elements should be 0.

When library_reserved_zero_43bits exists, its value should be 0 in a bitstream that complies with the standard. Other values are reserved for future ITU-T or ISO/IEC. The decoder side should ignore the syntax.

When a value of library_inbld_flag is 1, it indicates that a layer to which a profile_tier_level( ) syntax structure is applied needs to be decoded as indicated by a previously-defined independent non-bottom-layer decoding capability. When the value is 0, it indicates that the layer to which the profile_tier_level( ) syntax structure is applied does not need to be decoded as indicated by the previously-defined independent non-bottom-layer decoding capability. When peofilePresentFlag is 1, library_profile_idc is not in a range of 1 to 5. When j is in the range of 1 to 5, library_profile_compatibility_flag[j] is not 1. In this case, this syntax element does not exist and a value can be inferred to be 0. When library_profile_idc is not in the range of 1 to 5, j is in the range of 1 to 5, and library_profile_compatibility_flag[j] is not 1, the value of this syntax element should be 0.

When library_reserved_zero_bit exists, its value should be 0 in a bitstream that complies with the standard. A value 1 is reserved for future ITU-T or ISO/IEC. The decoder side should ignore the syntax.

The library_level_idc indicates a level of an encoded video sequence that conforms to previously-defined values. The bitstream cannot include a library_level_idc value that is not previously defined. Other values are reserved for future ITU-T or ISO/IEC.

"Previously-defined" means that a value is defined in appendix A or F in HEVC and VVC.

A set of decoding capability information that is used to describe a library bitstream referenced by a current bitstream is added for the foregoing new profile syntax elements based on definitions of existing profile syntax elements in HEVC and VVC. Therefore, the semantics of the foregoing newly-added syntax elements may one-to-one correspond to semantics of existing profile syntax elements in HEVC and VVC. The only difference is that the newly-added syntax elements describe decoding capability information of an external library bitstream referenced by the current bitstream. In addition, when semantics of library_same_standard_flag are expanded as follows: When a value is 1, it indicates that the external library bitstream referenced by the current bitstream complies with a same coding standard as the current bitstream, and decoding capability information of the library bitstream is described in the current bitstream. When the value is 0, it indicates that the external library bitstream referenced by the current bitstream does not comply with the standard, and the decoding capability information of the library bitstream is not described in the current bitstream.

The decoder may perform the following operations:

(1) Determine, based on library_picture_enable_flag in a VPS or an SPS, whether a current bitstream references an external library bitstream.

(2) When the current bitstream references the external library bitstream, parse library_same_standard_flag in a profile to determine whether the external library layer bitstream referenced by the current bitstream complies with the standard.

(3) When the external library bitstream referenced by the current bitstream satisfies the standard, parse a profile syntax element that describes the external library bitstream according to an existing profile parsing method in HEVC or VVC, to obtain decoding capability information required by the library layer bitstream.

In an optional step, the decoder of the current bitstream may be further used to decode the library layer bitstream. It should be noted that this increases a requirement for the decoder's decoding capability, for example, a requirement for a quantity of frames to be decoded per unit time.

When the external library bitstream referenced by the current bitstream does not comply with the standard, in an optional step, the decoder outputs information about a standard with which the library bitstream complies, so that a system can invoke a corresponding decoder to decode the library bitstream.

The encoder may perform the following operations:

(1) Determine a value of library_picture_enable_flag based on whether a current bitstream references an external library bitstream, and place the value in the bitstream.

(2) When the current bitstream references the external library bitstream, determine, based on whether the external library layer bitstream referenced by the current bitstream complies with the standard, a value of library_same_standard_flag in the bitstream.

(3) When the external library bitstream referenced by the current bitstream satisfies the standard, describe, in the bitstream, syntax elements of a profile and a level corresponding to decoding capability information required by the library layer bitstream.

In an optional step, the encoder of the current bitstream may be further used to encode the library layer bitstream. It should be noted that this increases a requirement for the encoder's decoding capability, for example, a requirement for a quantity of frames to be encoded per unit time.

When the external library bitstream referenced by the current bitstream does not comply with the standard, in an optional step, the encoder outputs information about a standard with which the library bitstream complies, so that a system can invoke a corresponding encoder to decode the library bitstream.

A person skilled in the art can understand that the functions described with reference to various illustrative logical blocks, modules, and algorithm steps disclosed and described in this specification can be implemented by hardware, software, firmware, or any combination thereof. If the embodiments are implemented by software, the functions described with reference to the illustrative logical blocks, modules, and steps may be stored in or transmitted over a computer readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a compact disc (CD) ROM (CD-ROM) or another CD storage apparatus, a magnetic disk storage apparatus or another magnetic storage apparatus, a flash memory, or any other medium that can be used to store desired program code in a form of an instruction or a data structure and that is accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a CD, a laser disc, an optical disc, a DIGITAL VERSATILE DISC (DVD), and a BLU-RAY DISC. The disks usually reproduce data magnetically, whereas the discs reproduce data optically with lasers. Combinations of the foregoing items should also be included in the scope of the computer-readable media.

Instructions may be executed by one or more processors such as one or more DSPs, general-purpose microprocessors, ASICs, FPGAs, or other equivalent integrated or discrete logic circuits. Therefore, the term "processor" used in this specification may be any one of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including the one or more processors described above).

In the foregoing embodiments, the descriptions in each embodiment have respective focuses. For a part that is not described in detail in an embodiment, refer to related descriptions in other embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   parsing, from a video bitstream, a library picture reference flag that indicates whether the video bitstream is allowed to be decoded by referencing a library picture corresponding to a library picture bitstream;
   based on the library picture reference flag indicating that the video bitstream is allowed to be decoded by referencing the library picture, parsing a first flag from the video bitstream; and
   based on the first flag having a first value: setting a value of a target parameter in a sequence header of the video bitstream as a value of a target parameter of the library picture bitstream, and reconstructing the library picture based on the value of the target parameter of the library picture bitstream;
   wherein the video bitstream comprises a library picture flag indicating that the video bitstream is not the library picture bitstream.

2. The method of claim 1, further comprising:
   reconstructing, based on the video bitstream and the library picture, a video picture corresponding to the video bitstream.

3. The method of claim 1, wherein the first flag is located in the sequence header of the video bitstream.

4. The method of claim 1, wherein the first flag comprises a parameter flag that indicates whether the value of the target parameter of the library picture bitstream is the same as the value of the target parameter in the sequence header of the video bitstream.

5. The method of claim 1, wherein the target parameter of the library picture bitstream comprises decoding capability information, and wherein the method further comprises:
   determining whether a decoding capability of a to-be-used decoder satisfies a requirement indicated by the decoding capability information; and
   based on the decoding capability of the to-be-used decoder satisfying the requirement, parsing, using the to-be-used decoder, the library picture bitstream to obtain the library picture.

6. The method of claim 1, further comprising:
   obtaining the library picture flag from a current bitstream; and
   setting the current bitstream as the video bitstream based on the library picture flag indicating that the video bitstream is not the library picture bitstream.

7. The method of claim 1, wherein the target parameter in the sequence header of the video bitstream comprises decoding capability information of the library picture bitstream, and wherein the method further comprises:
   parsing, from a video parameter set (VPS) of the video bitstream, the decoding capability information;
   parsing, from a sequence parameter set (SPS) of the video bitstream, the decoding capability information; or
   parsing, from the sequence header, the decoding capability information.

8. The method of claim 1, wherein the target parameter in the sequence header of the video bitstream comprises first decoding capability information of the video bitstream, wherein the first decoding capability information comprises a profile flag indicating a profile that comprises the video bitstream and a level flag indicating a level that comprises the video bitstream, and wherein the method further comprises:
   setting the profile flag and the level flag as second decoding capability information of the library picture bitstream.

9. A method, comprising:
   encoding a video picture by referencing a library picture corresponding to a library picture bitstream to obtain encoded data, wherein the video picture is allowed to be encoded by referencing the library picture; and
   adding a first flag to the encoded data to obtain a video bitstream;
   wherein the first flag is set to a first value and indicates that a value of a target parameter in a sequence header of the video bitstream is used as a value of a target parameter of the library picture bitstream;
   wherein the video bitstream references the library picture bitstream;
   wherein the target parameter in the sequence header of the video bitstream comprises first decoding capability information of the video bitstream, wherein the first decoding capability information comprises a profile flag indicating a profile that comprises the video bitstream and a level flag indicating a level that comprises the video bitstream; and
   wherein the library picture bitstream comprises second decoding capability information corresponding to the profile flag and the level flag.

10. A device, comprising:
    a memory configured to store instructions; and
    a processor coupled to the memory, wherein the processor is configured to execute the instructions to facilitate the following being performed by the device:
    obtaining a library picture flag from a current bitstream;
    setting the current bitstream as a video bitstream based on the library picture flag indicating that the video bitstream is not a library picture bitstream;
    parsing, from the video bitstream, a library picture reference flag that indicates whether the video bitstream is allowed to be decoded by referencing a library picture corresponding to the library picture bitstream;
    based on the library picture reference flag indicating that the video bitstream is allowed to be decoded by referencing the library picture, parsing a first flag from the video bitstream; and
    based on the first flag having a first value: setting a value of a target parameter in a sequence header of the video bitstream as a value of a second target parameter of the library picture bitstream, and reconstructing the library picture based on the value of the target parameter of the library picture bitstream.

11. The device of claim 10, wherein the processor is configured to execute the instructions to facilitate the following being performed by the device:
    reconstructing, based on the video bitstream and the library picture, a video picture corresponding to the video bitstream.

12. The device of claim 10, wherein the first flag is located in the sequence header of the video bitstream.

13. The device of claim 10, wherein the first flag comprises a parameter flag that indicates whether the value of the target parameter of the library picture bitstream is the same as the value of the target parameter in the sequence header of the video bitstream.

14. The device of claim 10, wherein the target parameter of the library picture bitstream comprises decoding capability information, and wherein the processor is configured to execute the instructions to facilitate the following being performed by the device:
    determining whether a decoding capability of a to-be-used decoder satisfies a requirement indicated by the decoding capability information; and
    based on the decoding capability of the to-be-used decoder satisfying the requirement, parsing, using the to-be-used decoder, the library picture bitstream to obtain the library picture.

15. The device of claim 10, wherein the video bitstream comprises a library picture flag indicating that the video bitstream is not the library picture bitstream.

16. The device of claim 10, wherein the target parameter in the sequence header of the video bitstream comprises decoding capability information of the library picture bitstream, and wherein the processor is configured to execute the instructions to facilitate the following being performed by the device:
    parsing, from a video parameter set (VPS) of the video bitstream, the decoding capability information;
    parsing, from a sequence parameter set (SPS) of the video bitstream, the decoding capability information; or
    parsing, from the sequence header, the decoding capability information.

17. A device, comprising:

a memory configured to store instructions; and a processor coupled to the memory, wherein the processor is configured to execute the instructions to facilitate the following being performed by the device:

encoding a video picture by referencing a library picture corresponding to a library picture bitstream to obtain encoded data, wherein the video picture is allowed to be encoded by referencing the library picture; and adding a first flag to the encoded data to obtain a video bitstream, wherein the first flag is set to a first value and indicates that a value of a target parameter in a sequence header of the video bitstream is used as a value of a target parameter of the library picture bitstream;

wherein the video bitstream references the library picture bitstream;

wherein the target parameter in the sequence header of the video bitstream comprises first decoding capability information of the video bitstream, wherein the first decoding capability information comprises a profile flag indicating a profile that comprises the video bitstream and a level flag indicating a level that comprises the video bitstream; and wherein the library picture bitstream comprises second decoding capability information corresponding to the profile flag and the level flag.

* * * * *

UNITED STATES PATENT AND TRADEMARK OFFICE
CERTIFICATE OF CORRECTION

PATENT NO. : 11,638,003 B2
APPLICATION NO. : 17/370120
DATED : April 25, 2023
INVENTOR(S) : Yu et al.

Page 1 of 1

It is certified that error appears in the above-identified patent and that said Letters Patent is hereby corrected as shown below:

In the Claims

Claim 10: Column 74, Line 21: "bitstream as a value of a second target parameter of the" should read -- bitstream as a value of a target parameter of the --.

Signed and Sealed this
Fifteenth Day of August, 2023

Katherine Kelly Vidal
*Director of the United States Patent and Trademark Office*